United States Patent
Kato et al.

(10) Patent No.: US 7,171,296 B2
(45) Date of Patent: Jan. 30, 2007

(54) INTEGRATED CONTROL APPARATUS FOR VEHICLE

(75) Inventors: Hiroaki Kato, Hekinan (JP); Minekazu Momiyama, Chiryu (JP); Takayuki Ohta, Okazaki (JP); Akira Kodama, Chiryu (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 306 days.

(21) Appl. No.: 10/957,542

(22) Filed: Oct. 1, 2004

(65) Prior Publication Data
US 2005/0125131 A1 Jun. 9, 2005

(30) Foreign Application Priority Data
Oct. 2, 2003 (JP) .............................. 2003-344743

(51) Int. Cl.
*G06G 7/00* (2006.01)
*B60T 8/175* (2006.01)
*B60K 28/16* (2006.01)

(52) U.S. Cl. ........................... 701/70; 701/80; 701/41; 701/87; 303/146; 303/147; 303/148; 303/149

(58) Field of Classification Search .................. 701/41, 701/70–72, 79, 80; 303/121, 146–150; 340/439
See application file for complete search history.

(56) References Cited

U.S. PATENT DOCUMENTS 6,898,500 B1 * 5/2005 Kobayashi ................... 701/48

FOREIGN PATENT DOCUMENTS

| JP | 09-109866 | 4/1997 |
|----|-----------|--------|
| JP | 10-310042 | 11/1998 |
| JP | 2002-254964 | 9/2002 |

OTHER PUBLICATIONS

Patent Abstracts of Japan for JP09-109866 published on Apr. 28, 1997.
Patent Abstracts of Japan for JP10-310042 published on Nov. 24, 1998.
Patent Abstracts of Japan for JP2002-254964 published on Sep. 11, 2002.

* cited by examiner

*Primary Examiner*—Y. Beaulieu
(74) *Attorney, Agent, or Firm*—Darby & Darby PC

(57) ABSTRACT

An electronic control unit calculates a target yaw rate in accordance with a vehicle speed and a steering angle and calculates the yaw rate difference on the basis of the target yaw rate and an actual yaw rate. The electronic control unit estimates the grip factor of a front wheel to road surface and sets a distribution ratio for distribution of a vehicle-control target value among actuators of a steering system, a brake system, and a drive system in accordance with the estimated grip factor. The electronic control unit controls the actuators of the three systems in accordance with control instruction values distributed on the basis of the vehicle-control target value and the distribution ratio.

8 Claims, 19 Drawing Sheets

Legend

- Y — Actual yaw rate
- V — Vehicle speed
- β — Vehicle-body skid angle
- Kf — Front cornering power
- Kr — Rear cornering power
- lf — Distance between front axle and center of gravity of vehicle
- lr — Distance between rear axle and center of gravity of vehicle
- δ — Actual steering angle
- βf — Front wheel skid angle
- βr — Rear wheel skid angle

INTEGRATED CONTROL APPARATUS FOR VEHICLE

INCORPORATION BY REFERENCE

The present application claims priority under 35 U.S.C. §119 to Japanese Patent Application No. 2003-344743 filed on Oct. 2, 2003. The content of the application is incorporated herein by reference in its entirety.

BACKGROUND OF THE INVENTION

1. Field of the Invention

The present invention relates to an integrated control apparatus for a vehicle capable of enhancing vehicular running stability.

2. Description of the Related Art

A conventionally known integrated control apparatus for a vehicle is disclosed in Japanese Patent Application Laid-Open (kokai) No. 9-109866. The integrated control apparatus for a vehicle combines braking force control with 4WS (4-wheel steering) steering-angle control and performs target follow-up control by use of yaw rate feedback, thereby enhancing vehicle stability during, for example, cornering. Japanese Patent Application Laid-Open (kokai) No. 2002-254964 also discloses another known integrated control apparatus for a vehicle. According to the technique of this publication, feedforward control is applied to actuators, which are objects of control, in a steering system, a brake system, and a drive system on the basis of target longitudinal forces (drive force and braking force), a target side force, and a target yaw moment of a vehicle, thereby enhancing vehicle stability. However, the integrated control apparatus disclosed in the publications do not reflect the state of a road surface on control. As a result, in some cases, expected vehicle stability is not attained.

Meanwhile, Japanese Laid-Open Patent Application No. 10-310042 discloses a vehicle control apparatus that reflects the behavioral condition of a vehicle and the state of the road surface on control. According to this technique, the maximum resultant of forces that can be generated between a wheel and the road surface is set as the radius of a friction circle; and the magnitude and direction of a force that the wheel generates are controlled such that the resultant of forces actually generated between the wheel and the road surface does not exceed the force represented by the set radius of the friction circle. Notably, the resultant of forces that are generated between a wheel (tire) and the road surface in every direction in a horizontal plane cannot exceed the product of the vertical load W at that time and the friction coefficient μ. Thus, the vector of the resultant remains within a circle having the radius μW. This circle is called a "friction circle."

Therefore, in a tire rotating at a certain slip angle, a resultant Ft of a longitudinal force Fx and a side force Fy, which are generated at the tire's contact surface, is represented as "$Ft=\sqrt{Fx^2+Fy^2}$."

According to the above-mentioned Japanese Patent Application Laid-Open (kokai) No. 10-310042, when a force on the above-mentioned friction circle is taken as a grip limit force Fg (=μW), the tire margin "Vmrg=1−(Ft/Fg)" is calculated. In accordance with the calculated tire margin, actuators in various systems, such as the steering system and the brake system, are controlled.

In the above-mentioned Japanese Patent Application Laid-Open (kokai) No. 10-310042, in order to obtain the grip limit force Fg, the friction coefficient of the road surface must be estimated. However, accurately estimating the current friction coefficient μ of the road surface is difficult. Also, estimating a momentary change in the friction coefficient of the road surface is difficult. Therefore, accurately estimating the grip limit force Fg, which varies according to the state of the road surface, is difficult. For this reason, when the tire margin, which is calculated by use of an estimated value of the grip limit force Fg, is used for control in the critical region of the vehicle (where the tire grips the road surface with a force near the grip limit force), no problem arises. However, using the tire margin for control before the critical region of the vehicle is reached is inadequate.

SUMMARY OF THE INVENTION

An object of the present invention is to provide an integrated control apparatus for a vehicle which integrally controls actuators in at least two of a steering system, a brake system, and a drive system, in an optimally distributed condition according to the behavioral condition of the vehicle and the state of a road surface without use of the friction coefficient of the road surface, to thereby enhance vehicle stability.

To achieve the above object, the present invention provides an integrated control apparatus for a vehicle, comprising vehicle behavioral-quantity detection device for detecting at least a vehicle behavioral-quantity; target vehicle behavioral-quantity calculation device for calculating a target vehicle behavioral-quantity in accordance with the vehicle behavioral-quantity; vehicle-control target value calculation device for calculating a vehicle-control target value on the basis of a difference between the target vehicle behavioral-quantity and the vehicle behavioral-quantity; estimation device for estimating a grip factor of a front wheel to road surface; distribution-ratio-setting device for setting, in accordance with the grip factor of the front wheel, a distribution ratio for distribution of the vehicle-control target value among actuators of at least two of a steering system, a brake system, and a drive system; and control device for controlling the actuators of the at least two systems in accordance with the vehicle-control target value distributed at the distribution ratio.

By virtue of the above configuration, actuators in at least two of the steering system, the brake system, and the drive system can be integrally controlled in an optimally distributed condition according to the behavioral condition of the vehicle and the state of the road surface without use of the friction coefficient of the road surface, whereby vehicle stability can be enhanced. In other words, the grip factor can be estimated with higher accuracy and robustness than in the case of the conventional method in which the grip factor is estimated from tire margin, which is obtained by use of the friction coefficient of the road surface, estimation of the friction coefficient with high accuracy and estimation of an instantaneous change in the friction coefficient being difficult. Thus, the vehicle-control target value can be optimally distributed among the actuator. Furthermore, the running stability of the vehicle can be optimized, and very high stability against disturbance can be provided.

Preferably, the target vehicle behavioral-quantity calculation device calculates a target yaw rate, which serves as the target vehicle behavioral-quantity; and the vehicle-control target value calculation device calculates the vehicle-control target value on the basis of a difference between the target yaw rate and an actual yaw rate, which serves as the vehicle behavioral-quantity.

In this case, since a vehicle-control target value is calculated on the basis of the difference between the target yaw rate and the actual yaw rate, the vehicle-control target value can be appropriately calculated, and optimal distribution among actuators of the steering, brake, and drive systems can be readily achieved.

Preferably, the target vehicle behavioral-quantity calculation device includes means for calculating a target side force, which serves as the target vehicle behavioral-quantity, and means for calculating a target yaw moment of the vehicle, which serves as the target vehicle behavioral-quantity; and the vehicle-control target value calculation device calculates the vehicle-control target value on the basis of a difference between the target side force and a side force, which serves as the vehicle behavioral-quantity, and a difference between the target yaw moment of the vehicle and an actual yaw moment of the vehicle, which serves as the vehicle behavioral-quantity.

In this case, since a vehicle-control target value is calculated on the basis of the difference (side force difference) between the target side force and the actual side force (side force) and the difference (yaw moment difference) between the target yaw moment of the vehicle and the actual yaw moment of the vehicle, optimal distribution of the vehicle-control target value among actuators of the steering, brake, and drive systems can be readily achieved.

Preferably, the vehicle behavioral-quantity detection device includes a device for detecting a quantity of driver's operation applied to driving-operation device of the vehicle; and the distribution-ratio-setting device sets a distribution ratio for distribution of the vehicle-control target value among the actuators of at least two of the steering system, the brake system, and the drive system in accordance with the quantity of the driver's operation and the grip factor of the front wheel.

In this case, since the distribution ratio for the vehicle-control target value is set in such a manner as to reflect the driver's intention, the running stability of the vehicle can be ensured.

Preferably, the integrated control apparatus for a vehicle according to the first aspect further comprises acquisition device for acquiring a peripheral condition of the vehicle; and in the first aspect, the distribution-ratio-setting device sets a distribution ratio for distribution of the vehicle-control target value among the actuators of at least two of the steering system, the brake system, and the drive system in accordance with peripheral-condition data regarding the vehicle acquired by the acquisition device and the grip factor of the front wheel.

In this case, since the vehicle-control target value can be optimally distributed among the steering, brake, and drive systems in accordance with the grip factor and the peripheral condition of the vehicle, the running stability of the vehicle can be improved in accordance with the grip factor and the peripheral condition of the vehicle.

Preferably, the acquisition device includes vehicle distance detection device for detecting a distance between an own vehicle and the other vehicle as measured at least in a running direction of the vehicle or in a direction opposite the running direction; and the distribution-ratio-setting device changes the distribution ratio for distribution of the vehicle-control target value to the actuator(s) of the brake system or the drive system in accordance with the detected distance.

In this case, the running stability of the vehicle can be improved in accordance with the distance to the other vehicle, which serves as the peripheral condition of the vehicle, and the grip factor.

Preferably, the integrated control apparatus further comprises image capture device, as the acquisition device, for capturing an image of a peripheral condition of the vehicle; calculation device for calculating a radius of an approaching curve of a lane in which the vehicle is running, on the basis of image data regarding the peripheral condition of the vehicle captured by the image capture device; and judgment device for judging whether or not the vehicle can run along the curve having the calculated radius. In the seventh aspect, when the judgment device judges that the vehicle cannot run along the curve having the calculated radius while running in the lane, the vehicle-control target value calculation device calculates the vehicle-control target value while making correction for allowing the vehicle to run along the curve while running in the lane; and the distribution-ratio-setting device sets a distribution ratio for distribution of the vehicle-control target value among the actuators of at least two of the steering system, the brake system, and the drive system such that the vehicle can run along the curve while running in the lane.

In this case, when the radius of an approaching curve of the lane in which the vehicle is running is judged from the current vehicle behavioral-quantity too small for the vehicle to run along the curve while running in the lane, a distribution ratio for the actuators is calculated such that the vehicle can run along the curve while running in the lane and such that running stability is maintained. Thus, the driver's mistake in measuring the distance with his/her eyes and the driver's steering mistake can be compensated.

Preferably, the integrated control apparatus further comprises obstacle judgment device for judging from peripheral-condition data acquired by the acquisition device whether or not an obstacle is present ahead of the vehicle. In the eighth aspect, when the obstacle judgment device judges that an obstacle is present, the vehicle-control target value calculation device calculates the vehicle-control target value while making correction for the vehicle to avoid collision with the obstacle; and the distribution-ratio-setting device sets a distribution ratio for distribution of the vehicle-control target value among the steering system, the brake system, and the drive system such that the vehicle avoids collision with the obstacle.

In this case, the vehicle can avoid collision with an obstacle while the stability of the vehicle is ensured.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
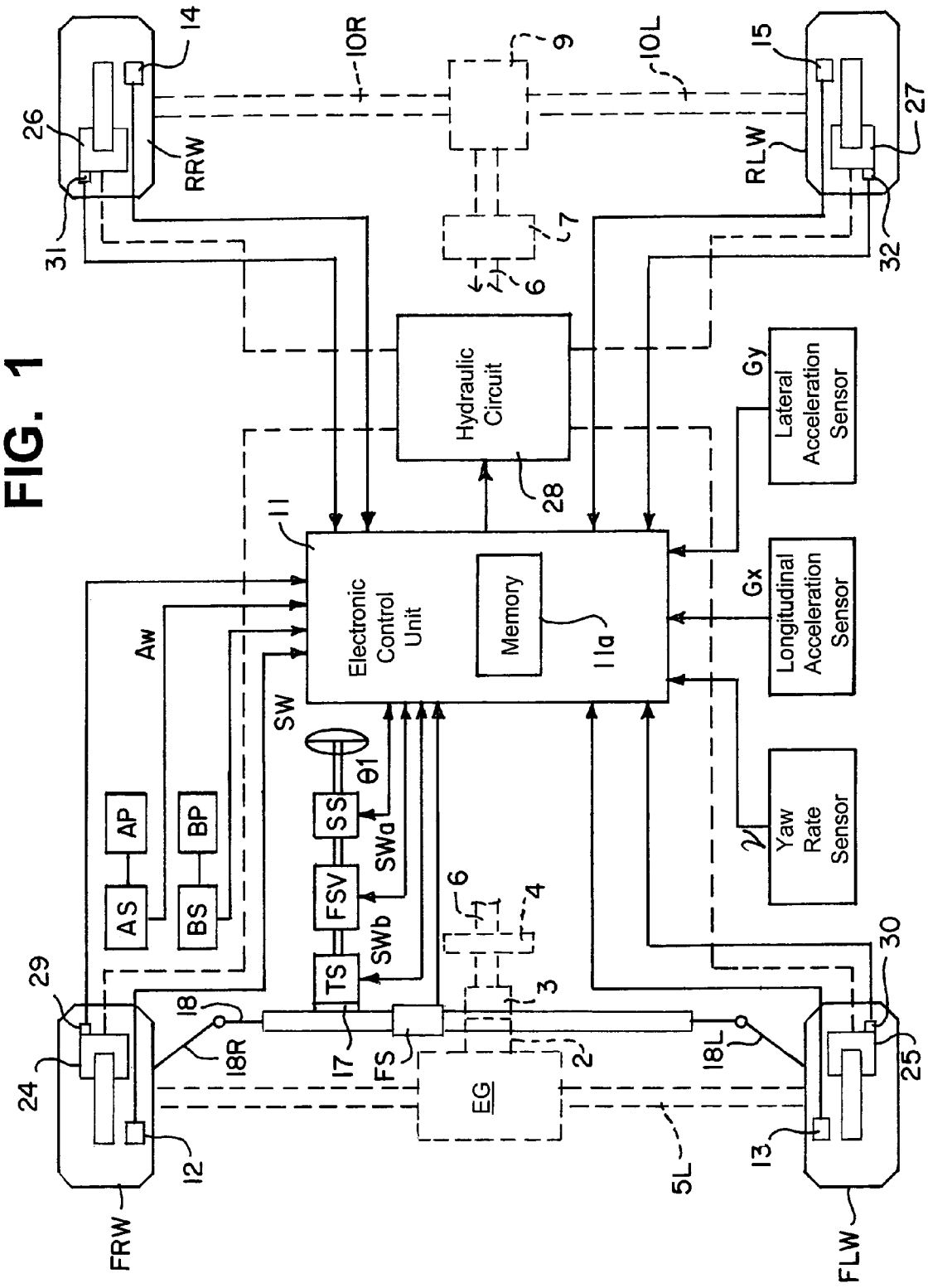
FIG. 1 is a schematic, configurational block diagram of an integrated control apparatus according to an embodiment of the present invention.
Figure 2:
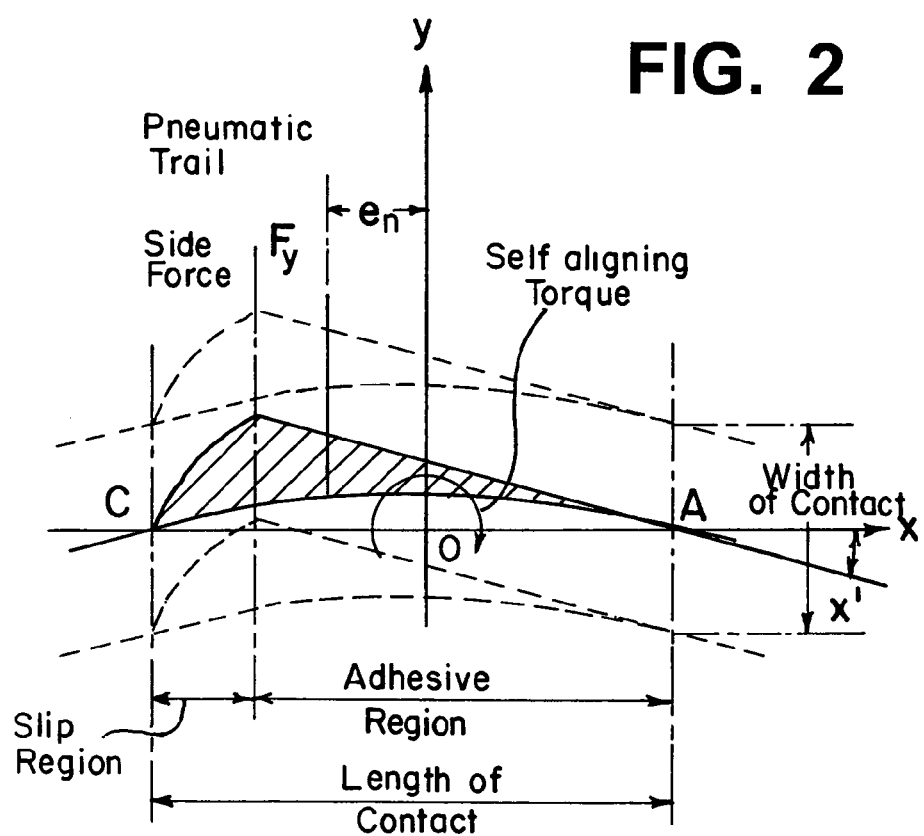
FIG. 2 is a graph showing the relation between self-aligning torque and side force.
Figure 3:
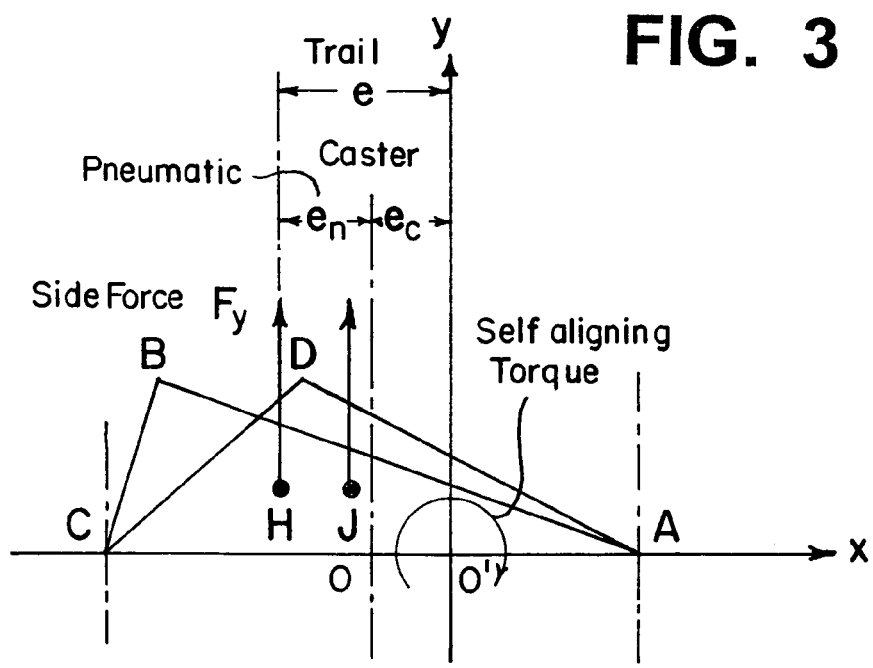
FIG. 3 is a simplified view of the situation depicted in FIG. 2, showing the relation between self-aligning torque and side force.
Figure 4:
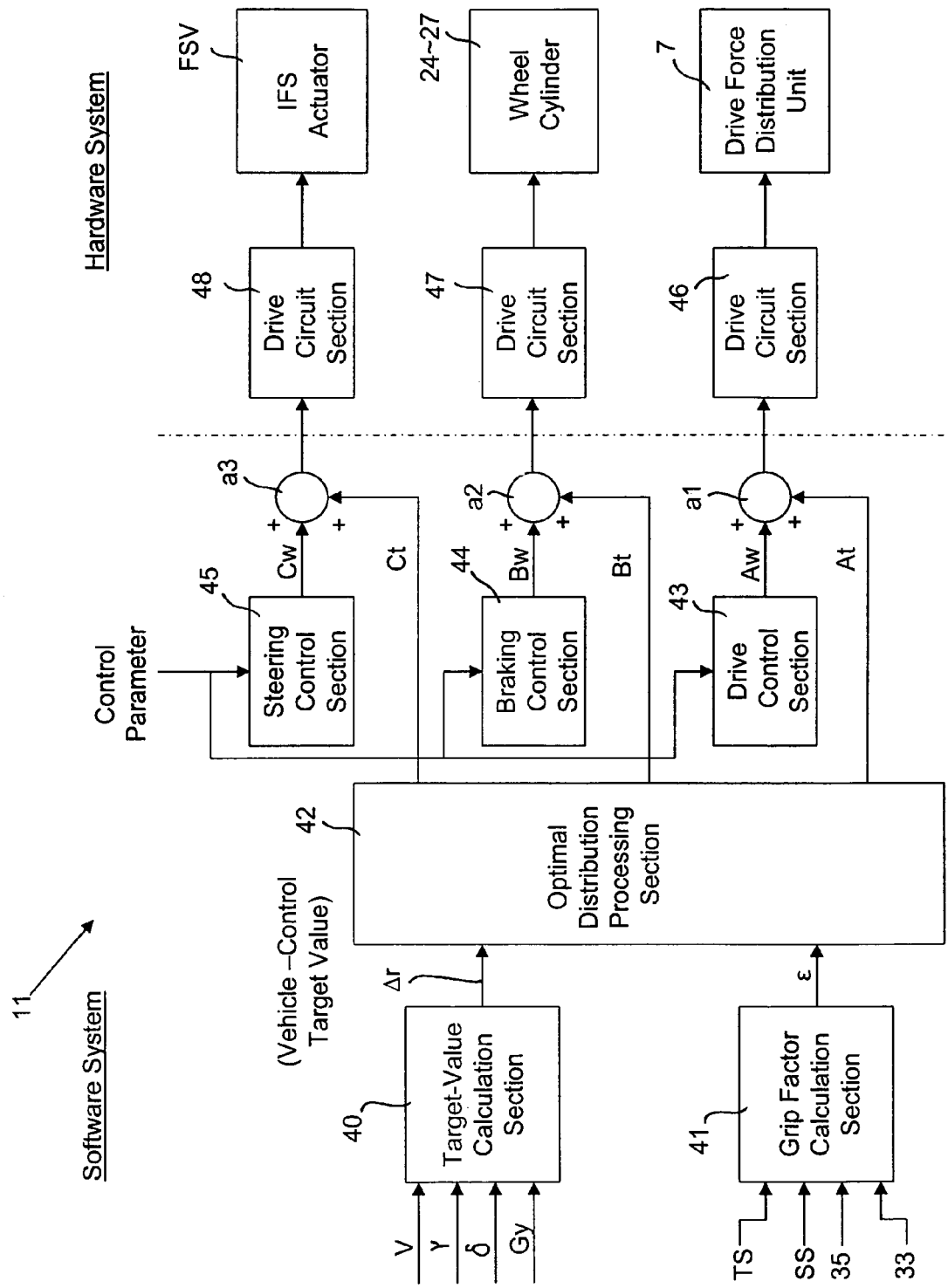
FIG. 4 is a control block diagram of an electronic control unit.
Figure 5:
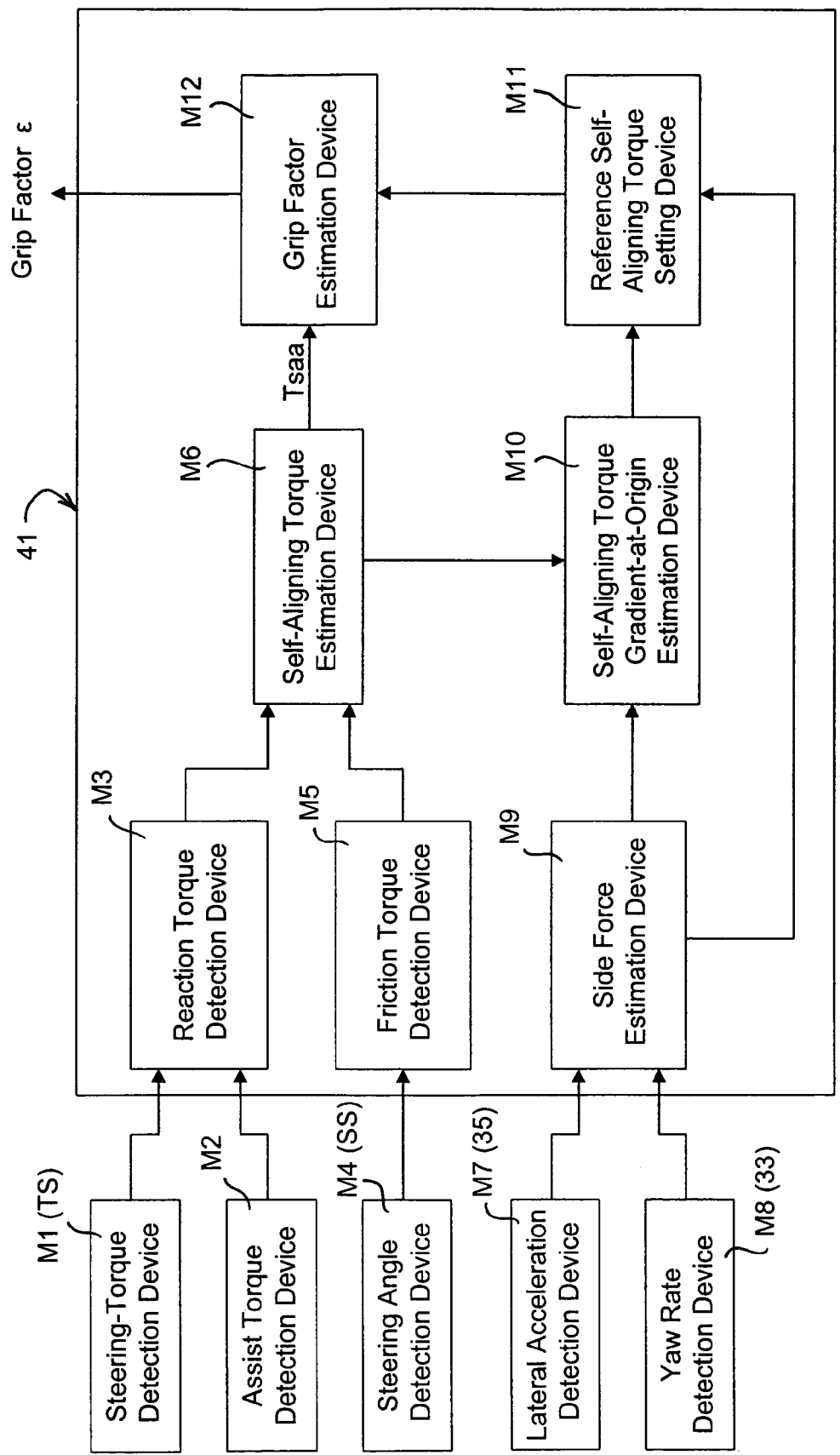
FIG. 5 is a control block diagram of a grip factor calculation section of the electronic control unit.
Figure 6:
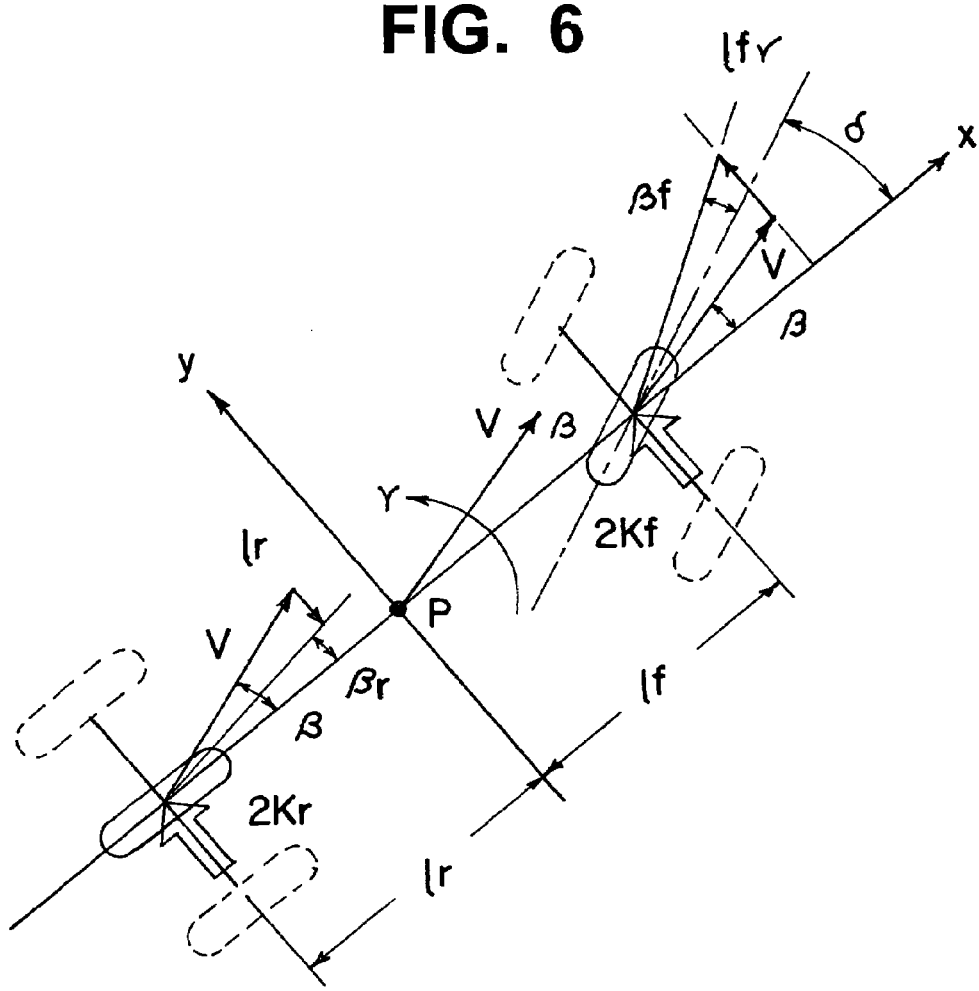
FIG. 6 is an explanatory view showing a 2-wheel vehicle model having a front wheel and a rear wheel.
Figure 7:
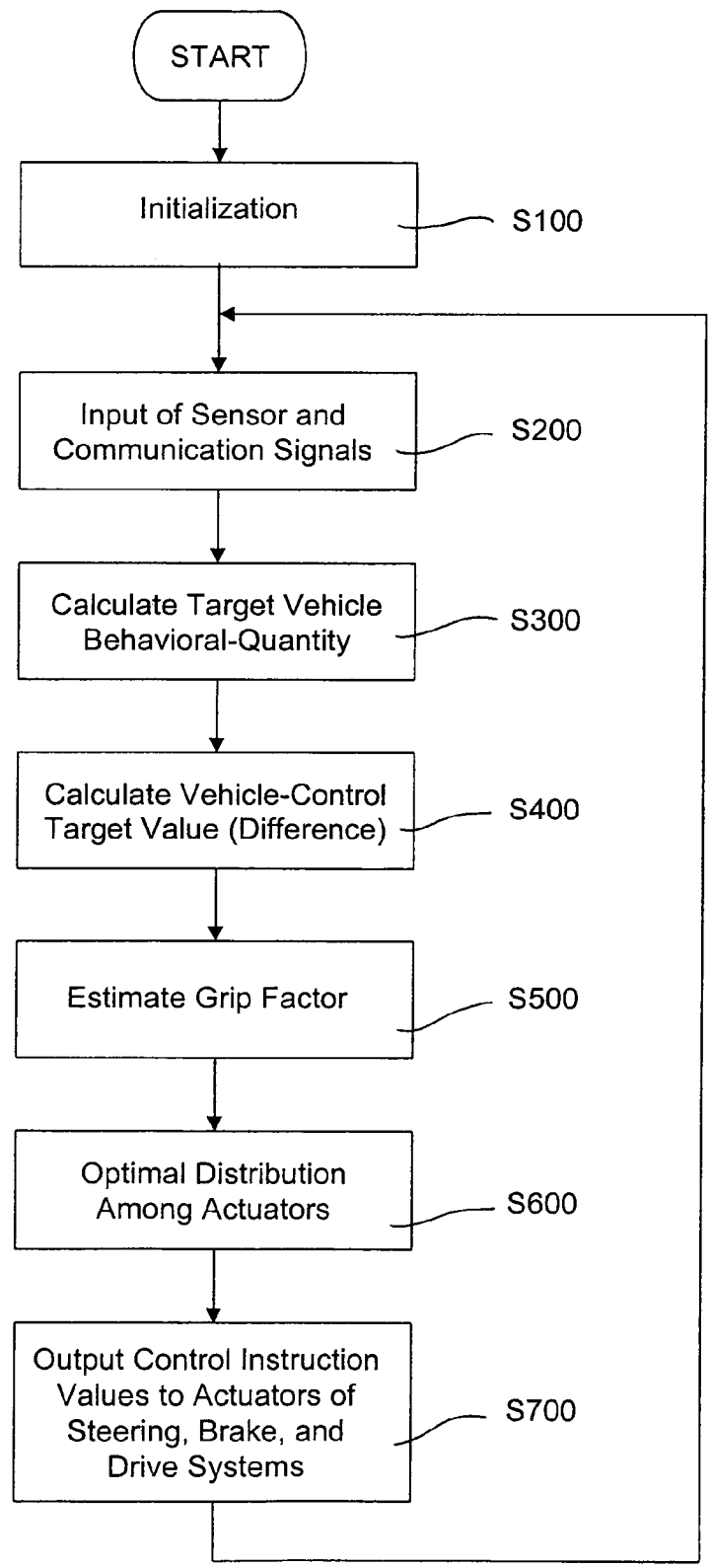
FIG. 7 is a control flowchart which the electronic control unit follows for execution of control.
Figure 8:
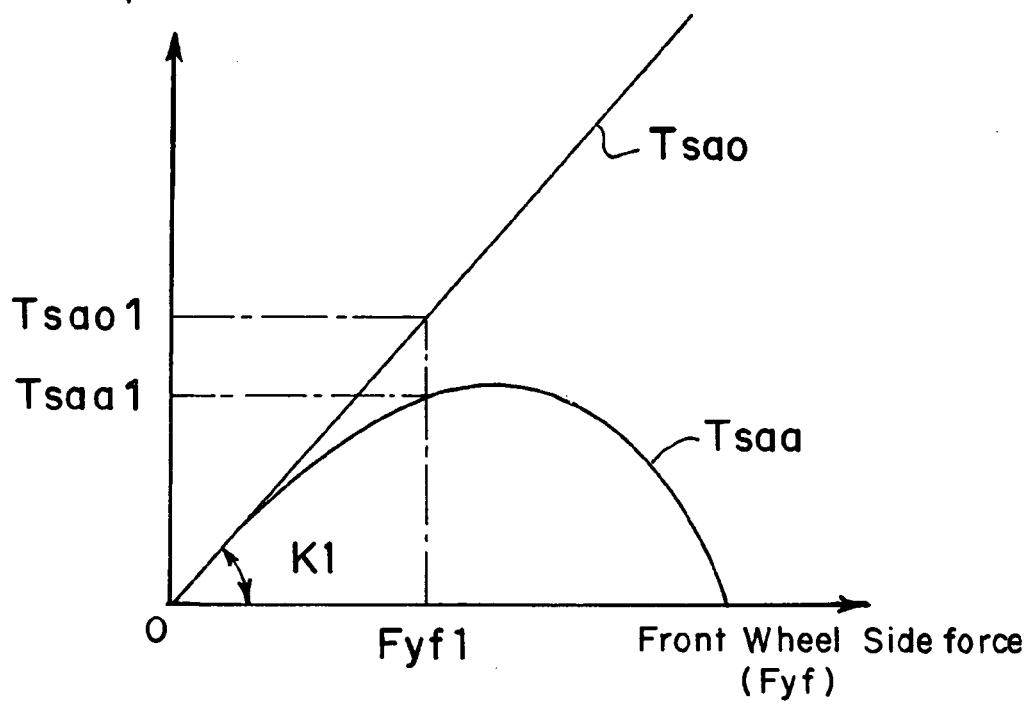
FIG. 8 is a graph showing a characteristic of side force vs. self-aligning torque.
Figure 9:
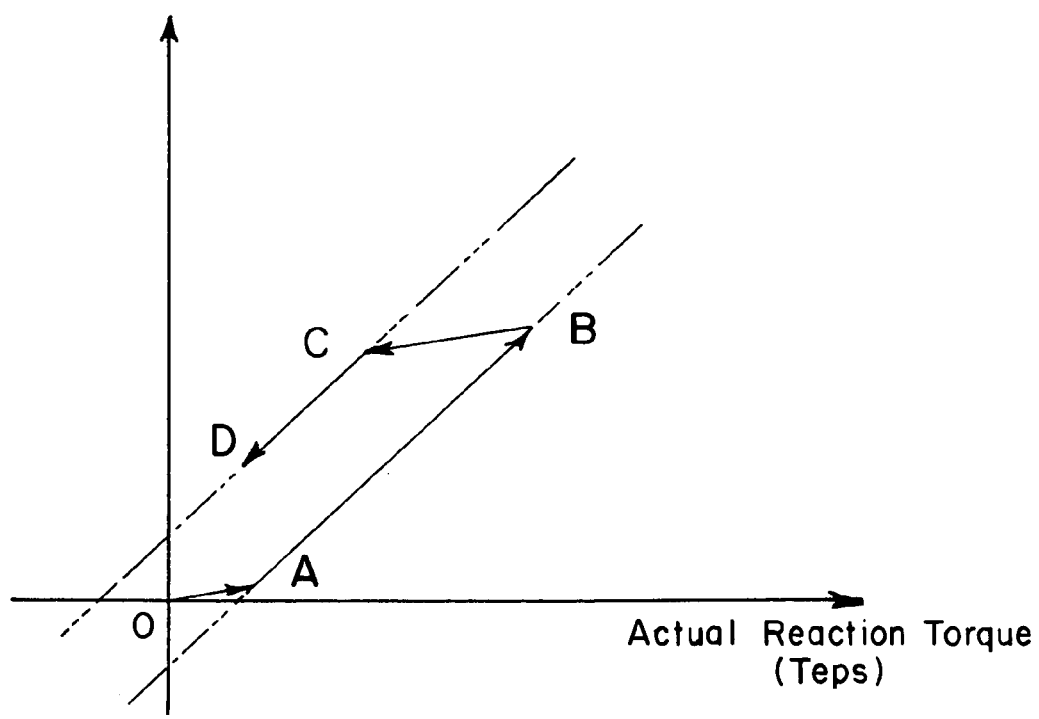
FIG. 9 is a graph showing a characteristic of self-aligning torque vs. actual reaction torque, for explanation of friction component of a steering mechanism.

An embodiment of the present invention will next be described with reference to FIGS. 1 to 9. FIG. 1 is a schematic, configurational block diagram of an integrated control apparatus for a vehicle according to the present embodiment. FIG. 2 is a graph showing the relation between self-aligning torque and side force in an ordinary vehicle whose tires are rolling while skidding. FIG. 3 is a simplified view of the situation depicted in FIG. 2, showing the relation between self-aligning torque and side force. FIG. 4 is a block diagram of an electronic control unit 11. FIG. 5 is a block diagram of a grip factor calculation section 41. FIG. 6 is an explanatory view showing a 2-wheel vehicle model having a front wheel and a rear wheel. FIG. 7 is a control flowchart. FIG. 8 is a graph showing a characteristic of side force vs. self-aligning torque. FIG. 9 is a graph showing a characteristic of self-aligning torque vs. steering-mechanism friction component, in relation to correction of self-aligning torque in the course of estimation of self-aligning torque.

Drive System

First, the drive system of a vehicle 1 will be described. As shown in FIG. 1, a center differential 4 is connected to an engine EG of the vehicle 1 via a torque converter 2 and a transmission 3. Front axles 5R and 5L are connected to the center differential 4 via an unillustrated front propeller shaft and an unillustrated front differential. A front right wheel FRW is attached to the front axle 5R, and a front left wheel FLW is attached to the front axle 5L. A drive force distribution unit 7, which serves as drive force distribution device, is connected to the center differential 4 via a rear propeller shaft 6. While the drive force distribution unit 7 is connected to the rear propeller shaft 6, a rear differential 9 is connected to the drive force distribution unit 7 via a drive pinion shaft 8. A rear right wheel RRW and a rear left wheel RLW are connected to the rear differential 9 via a pair of rear axles 10R and 10L, respectively.

The drive force of the engine EG is transmitted to the center differential 4 via the torque converter 2 and the transmission 3 and further to the front right wheel FRW and the front left wheel FLW via the unillustrated front propeller shaft, the unillustrated front differential, and the front axles 5R and 5L. In the case where the rear propeller shaft 6 and the drive pinion shaft 8 are connected together in a torque-transmittable condition by means of the drive force distribution unit 7, the drive force of the engine EG is transmitted to the rear right wheel RRW and the rear left wheel RLW via the rear propeller shaft 6, the drive pinion shaft 8, the rear differential 9, and the rear axles 10R and 10L.

The drive force distribution unit 7 includes an unillustrated known electromagnetic clutch mechanism of a wet multiple-disc type. The electromagnetic clutch mechanism has a plurality of clutch discs, which are frictionally engaged with each other or are disengaged from each other. When current corresponding to a control instruction value is supplied to an electromagnetic solenoid (not shown), which serves as an actuator, contained in the electromagnetic clutch mechanism, the clutch discs are frictionally engaged with each other, whereby torque is transmitted to the rear right wheel RRW and the rear left wheel RLW.

The frictional engagement force between the clutch discs varies depending on the quantity of current (intensity of current) supplied to the electromagnetic solenoid. By device of controlling the quantity of current supplied to the electromagnetic solenoid, the transmission torque between the front right and left wheels FRW and FLW and the rear right and left wheels RRW and RLW; i.e., the restraint force therebetween, can be adjusted. As the frictional engagement force between the clutch discs increases, the transmission torque between the front wheels and the rear wheels increases. By contrast, as the frictional engagement force between the clutch discs decreases, the transmission torque between the front wheels and the rear wheels decreases. The electronic control unit 11 controls current supplied to the electromagnetic solenoid in terms of supply and shutoff of the current and adjustment of the quantity of the current. When supply of current to the electromagnetic solenoid is shut off, the clutch discs are disengaged from each other, thereby shutting off transmission of torque to the rear wheels (rear right wheel RRW and rear left wheel RLW). In this manner, the electronic control unit 11 controls the frictional engagement force between the clutch discs in the drive force distribution unit 7, to thereby select a 4-wheel drive mode or a 2-wheel drive mode. Also, in the 4-wheel drive mode, the electronic control unit 11 controls the drive force distribution ratio (torque distribution ratio) between the front wheels and the rear wheels. In the present embodiment, the drive force distribution rate between the front wheels and the rear wheels can be adjusted in the range of from 100:0 to 50:50.

The vehicle 1 has an accelerator pedal AP. An accelerator sensor AS inputs a detection signal corresponding to a stepping-on measurement of the accelerator pedal AP to the electronic control unit 11 mounted on the vehicle 1. In accordance with the detection signal, the electronic control unit 11 controls the throttle opening of the engine EG. As a result, the output of the engine EG is controlled in accordance with the stepping-on measurement of the accelerator pedal AP. The accelerator sensor AS corresponds to device for detecting throttle opening (driving-operation quantity). Wheel speed sensors 12 to 15 for detecting the rotational speed (wheel speed) of the corresponding wheels are provided respectively on the front right wheel FRW, the front left wheel FLW, the rear right wheel RRW, and the rear left wheel RLW. Detection signals (wheel speeds Vfr, Vfl, Vrr, and Vrl) from the corresponding wheel speed sensors 12 to 15 are output to the electronic control unit 11.

Steering System

Next, the steering system of the vehicle 1 will be described. The steering system includes a steering wheel SW, a first shaft SWa, a second shaft SWb, a rack 18, a steering angle sensor SS, a steering torque sensor TS, an IFS actuator FSV, and an EPS actuator FS. One end of the first shaft SWa is connected to the steering wheel SW, and the other end of the first shaft SWa is connected to the input side of the IFS actuator FSV. The steering wheel SW corresponds to driving-operation device.

The IFS actuator FSV includes an electric motor, and a speed reducer composed of a plurality of gears. One end of the second shaft SWb is connected to the output side of the IFS actuator FSV, and the other end of the second shaft SWb is connected to the input side of a steering gear box 17. The steering gear box 17 converts a rotational motion, which is input from the second shaft SWb, into an axial motion of the rack 18 by device of the rack 18 and a pinion gear (not shown). The axial motion of the rack 18; i.e., a reciprocating motion, is transmitted to the front left wheel FLW and the front right wheel FRW via left and right tie rods 18L and 18R, thereby steering the front wheels. By virtue of the above configuration, the IFS actuator FSV changes the ratio of an output gear to an input gear in real time in accordance with a vehicle speed V and varies the ratio of the output angle of the second shaft SWb to the steering angle of the first shaft SWa, by device of the above-mentioned electric motor and speed reducer (not shown). The IFS actuator FSV serves as a transmission-ratio-varying device.

Notably, IFS is an acronym for Intelligent Front Steer and device the following: in order to improve drivability and safety of a vehicle, vehicle behavioral quantities, such as yaw rate and vehicle-body slip angle, are detected and are fed back to steering of steerable wheels (front wheels) Control of IFS is usually called "IFS control".

The steering angle sensor SS detects the rotational angle (steering angle θ) of the first shaft SWa and inputs a steering angle signal indicative of the detected angle to the electronic control unit 11. The EPS actuator FS has an electric motor arranged coaxially with the rack 18. Under control of the electronic control unit 11, the EPS actuator FS generates an assist force in accordance with the state of steering and provides the assist force to the rack 18. In other words, the EPS actuator FS functions as a steering actuator for assisting steering. The electronic control unit 11 has a variable-transmission-ratio control function that causes the IFS actuator FSV to vary the steering gear ratio in accordance with the speed of a vehicle (vehicle speed), as well as a steering control function that causes the EPS actuator FS to generate an assist force in accordance with the state of steering, thereby assisting steering.

Brake System

Next, the brake system of the vehicle 1 will be described. The brake system includes wheel cylinders 24 to 27, which serve as braking device and are provided respectively for the front right wheel FRW, the front left wheel FLW, the rear right wheel RRW, and the rear left wheel RLW; a hydraulic circuit 28; an unillustrated master cylinder; and a brake pedal BP for driving the master cylinder. The hydraulic circuit 28 includes a reservoir, an oil pump, and various valve devices. The brake fluid pressures of the wheel cylinders 24 to 27 are usually controlled via the hydraulic circuit 28 by device of the brake fluid pressure of the master cylinder, which is driven in accordance with the stepping-on force of the brake pedal BP. The brake fluid pressure of each of the wheel cylinders 24 to 27 exerts a braking force on the corresponding wheel.

In execution of predetermined control, such as antilock braking control, the electronic control unit 11 controls solenoid valves (unillustrated) of the hydraulic circuit 28 on the basis of various control parameters, which will be described later, to thereby individually control the brake fluid pressures of the wheel cylinders 24 to 27; for example, to increase, decrease, or hold the brake fluid pressures. A brake stepping-on-force sensor BS inputs, to the electronic control unit 11, a signal corresponding to a stepping-on force when the brake pedal BP is stepped on. The electronic control unit 11 detects, from the signal, a stepping-on force of the brake pedal BP. The solenoid valves correspond to actuators in the control system.

Fluid pressure sensors 29 to 32 detect the brake fluid pressures of the corresponding wheel cylinders 24 to 27 and input detection signals indicative of the detected brake fluid pressures to the electronic control unit 11. The electronic control unit 11 detects, from the detection signals, the braking conditions of the front right wheel FRW, the front left wheel FLW, the rear right wheel RRW, and the rear left wheel RLW.

Control System

Next, the control system of the vehicle 1 will be described.

The electronic control unit 11 includes a digital computer. The electronic control unit 11 may assume the form of a single ECU (electronic control unit) or the form of a plurality of ECUs corresponding to controls to be performed. The ECU includes a CPU and a memory 11a, which includes ROM and RAM. The electronic control unit 11 stores in the memory 11a detection signals mentioned below and associated with behavioral conditions of the vehicle 1, as control parameters. On the basis of the control parameters, the electronic control unit 11 integrally controls the steering system, the drive system, and the brake system of the vehicle 1, to thereby stabilize the running posture of the vehicle 1; i.e., to improve vehicle stability. The electronic control unit 11 corresponds to control device.

Outline of Engine Control

A detection signal indicative of the stepping-on measurement of the accelerator pedal AP is input to the electronic control unit 11 from the accelerator sensor AS. On the basis of the stepping-on measurement of the accelerator pedal AP, the electronic control unit 11 calculates the throttle opening of the engine EG and outputs a control signal indicative of the throttle opening to the engine EG, to thereby control the engine EG. The calculated throttle opening is stored in the memory 11a.

Calculation of Vehicle Speed

Detection signals indicative of the wheel speeds Vfr, Vfl, Vrr, and Vrl of the front right wheel FRW, the front left wheel FLW, the rear right wheel RRW, and the rear left wheel RLW, respectively, are input to the electronic control unit 11 from the wheel speed sensors 12 to 15. On the basis of the input detection signals, the electronic control unit 11 calculates the wheel speeds of the front right wheel FRW, the front left wheel FLW, the rear right wheel RRW, and the rear left wheel RLW and stores the calculated values in the memory 11a as parameters. On the basis of the calculation results, the electronic control unit 11 calculates the vehicle speed V of the vehicle 1 and stores the calculated value in the memory 11a as a parameter. In the present embodiment, the average of the wheel speeds Vfr, Vfl, Vrr, and Vrl is calculated and taken as the vehicle speed V (=(Vfr+Vfl+Vrr+Vrl)/4). In the above embodiment, the electronic control unit 11 corresponds to vehicle behavioral-quantity detection device for detecting the vehicle speed V.

Control of EPS Actuator FS

A steering angle signal, which is a detection signal indicative of the steering angle θ of the steering wheel SW, is input to the electronic control unit 11 from the steering angle sensor SS. Also, a detection signal indicative of a steering torque Tstr is input to the electronic control unit 11 from the steering torque sensor TS. On the basis of the detection signals, the electronic control unit 11 calculates the steering angle θ and the steering torque and stores the calculated values in the memory 11a. On the basis of the steering torque and the above-mentioned vehicle speed V, the electronic control unit 11 calculates an assist instruction value. On the basis of the calculated assist instruction value, the electronic control unit 11 assistively controls the EPS actuator FS.

Control of IFS Actuator FSV

The electronic control unit 11 determines, as a target instruction value, an angle instruction value from an unillustrated vehicle-speed-vs.-steering-gear-ratio map. The angle instruction value corresponds to a target rotational angle of the electric motor of the IFS actuator FSV, which target rotational angle is uniquely specified in relation to the steering angle θ and the vehicle speed V. The electronic control unit 11 causes a motor voltage corresponding to the determined angle instruction value to be supplied to a steering control section 45 (see FIG. 4) via unillustrated amplification device. The vehicle-speed-vs.-steering-gear-ratio map is prepared such that a steering gear ratio N increases with the vehicle speed V; i.e., such that, as the vehicle speed V increases, the steering gear ratio N increases.

Thus, the steering gear ratio N can be set in relation to the vehicle speed V, for example, as follows: in relation to a given steering angle θ of the steering wheel SW, the output angle of the IFS actuator FSV is large when the vehicle is halted or is running at low speed, and is small when the vehicle is running at high speed.

The steering quantity of the front right wheel FRW and the front left wheel FLW; i.e., the steering angle (actual steering angle δ) of the front wheels (wheels to be steered), is proportional to the above-mentioned output angle. As a result, for example, in the case where the vehicle is halted or is running at low speed, the steering gear ratio N in the IFS actuator FSV is set low; thus, even when the steering angle of the steering wheel SW is small, the front wheels are steered to a great extent, thereby facilitating the driver's steering. In the case where the vehicle is running at high speed, the steering gear ratio N in the IFS actuator FSV is set high; thus, even when the steering angle of the steering wheel SW is large, the wheels are steered to a small extent, thereby ensuring stability of vehicle behavior. On the basis of the steering gear ratio N, the electronic control unit 11 calculates the actual steering angle δ (=θ/N), which is an actual steering angle of the front wheels, from the above-mentioned steering angle θ. The steering gear ratio N is the ratio of the actual steering angle δ to the steering angle θ of the steering wheel SW and is obtained on the basis of the aforementioned map. Therefore, the actual steering angle δ is calculated on the basis of the map. Notably, the actual steering angle δ may be calculated as follows: an output angle sensor is provided for detecting the rotational angle of the second shaft SWb, and the actual steering angle δ is calculated on the basis of a detection signal from the output angle sensor. The electronic control unit 11 corresponds to variable-transmission-ratio control device. The electronic control unit 11, which calculates the actual steering angle δ, corresponds to the vehicle behavioral-quantity detection device.

Braking Control

A detection signal indicative of the stepping-on measurement of the brake pedal BP is input to the electronic control unit 11 from the brake stepping-on-force sensor BS. On the basis of the input detection signal, the electronic control unit 11 calculates a stepping-on measurement. In execution of predetermined control, such as antilock braking control, on the basis of the calculated stepping-on measurement, the electronic control unit 11 calculates required brake fluid pressures for the wheel cylinders 24 to 27 and outputs control instruction values for generating the required brake fluid pressures to corresponding drive circuit sections 47 of the hydraulic circuit 28 for driving the corresponding solenoid valves. Also, detection signals indicative of brake fluid pressures of the wheel cylinders 24 to 27 are input to the electronic control unit 11 from the fluid pressure sensors 29 to 32. On the basis of the detection signals, the electronic control unit 11 calculates the brake fluid pressures of the wheel cylinders 24 to 27 and stores the calculated values in the memory 11a as control parameters. The electronic control unit 11 performs feedback control by device of using detected brake fluid pressures as feedback quantities.

As shown in FIG. 1, the vehicle 1 has a yaw rate sensor 33, a longitudinal acceleration sensor 34, and a lateral acceleration sensor 35. The yaw rate sensor 33 inputs a detection signal indicative of an actual yaw rate γ, which is an actual yaw rate of the vehicle 1, to the electronic control unit 11. On the basis of the detection signal, the electronic control unit 11 calculates the actual yaw rate γ and stores the calculated value in the memory 11a as a control parameter. The longitudinal acceleration sensor 34 inputs a detection signal indicative of an actual longitudinal acceleration Gx, which is an actual longitudinal acceleration of the vehicle 1, to the electronic control unit 11. On the basis of the detection signal, the electronic control unit 11 calculates the actual longitudinal acceleration Gx and stores the calculated value in the memory 11a as a control parameter. The lateral acceleration sensor 35 inputs a detection signal indicative of an actual lateral acceleration Gy, which is an actual lateral acceleration of the vehicle 1, to the electronic control unit 11. On the basis of the detection signal, the electronic control unit 11 calculates the actual lateral acceleration Gy and stores the calculated value in the memory 11*a* as a control parameter.

The yaw rate sensor 33 corresponds to vehicle behavioral-quantity detection device for detecting the actual yaw rate $\gamma$.

Control Block Diagram

Next, control blocks of the integrated control apparatus will be described with reference to the control block diagram of FIG. 4. In FIG. 4, reference numerals 40 to 45 and a1 to a3 denote control blocks in the software system of the electronic control unit 11; and drive circuit sections 46 to 48 and subsequent blocks are those in the hardware system.

Target-Value Calculation Section 40

A target-value calculation section 40 calculates a target yaw rate $\gamma^*$ and a target slip angle $\beta^*$, which are target vehicle behavioral-quantities, on the basis of the vehicle speed V and the actual steering angle $\delta$ and by use of known calculation methods. Specifically, the target-value calculation section 40 calculates the target yaw rate $\gamma^*$ and the target slip angle $\beta^*$ (target skid angle) of the vehicle 1 on the basis of the following fundamental equations of motion of a vehicle.

$$mV\frac{d\beta}{dt} + 2(K_f + K_r)\beta + \left[mV + \frac{2}{V}(l_f K_f - l_r K_r)\right]\gamma = 2K_f\delta \quad (1)$$

$$2(l_f K_f - l_r K_r)\beta + I\frac{d\gamma}{dt} + \frac{2(l_f^2 K_f + l_r^2 K_r)}{V}\gamma = 2l_f K_f\delta \quad (2)$$

Eq. (1) and Eq. (2) are known equations of motion of the vehicle 1, which is modeled as a 2-wheel vehicle having a front wheel and a rear wheel as shown in FIG. 6. In Eqs. (1) and (2), m is inertial mass of the vehicle; V is vehicle speed; $\beta$ is vehicle-body skid angle (vehicle-body slip angle); Kf is front cornering power; Kr is rear cornering power; lf is distance between the front axle and the center of gravity P0 of the vehicle; lr is distance between the rear axle and the center of gravity P0 of the vehicle; $\delta$ is actual steering angle; and I is yawing moment of inertia. In FIG. 6, $\beta$f is front-wheel skid angle (front-wheel slip angle), and $\beta$r is rear-wheel skid angle (rear-wheel slip angle). Additionally, x and y represent coordinate axes of the vehicle that pass through the center of gravity P0 of the vehicle. In Eq. (1), 2Kf$\delta$ is the side force of the vehicle 1 acting on the center of gravity P0 of the vehicle 1.

The target-value calculation section 40 calculates a yaw rate difference $\Delta\gamma$ between the actual yaw rate $\gamma$ and the target yaw rate $\gamma^*$ and uses the calculated yaw rate difference $\Delta\gamma$ as a vehicle-control target value. The target-value calculation section 40 corresponds to target vehicle behavioral-quantity calculation device and vehicle-control target value calculation device.

Grip Factor Calculation Section 41

As shown in FIG. 5, a grip factor calculation section 41 includes reaction torque detection device M3, friction torque estimation device M5, self-aligning torque estimation device M6, self-aligning torque gradient-at-origin estimation device M10, reference self-aligning torque setting device M11, and grip factor estimation device M12. The grip factor calculation section 41 estimates a grip factor $\epsilon$ of the front wheels by use of these device. The grip factor calculation section 41 corresponds to estimation device for estimating the grip factor of a front wheel.

Estimation of the grip factor 6 of a front wheel will next be described.

Automotive Technology Handbook (Volume 1), Fundamentals and Theory, issued by Society of Automotive Engineers of Japan, Inc., Dec. 1, 1990, pp. 179 and 180, explains the state of a tire that rolls while skidding at a skid angle $\alpha$, as shown in FIG. 2. Specifically, in FIG. 2, the tread surface of a tire represented by the broken lines comes into contact with the road surface at the front end of a contact surface including the point A, adheres to the road surface over a region ranging from the point A to the point B, and moves in the moving direction of the tire. At a point where a deformation force induced by lateral shear deformation becomes equal to a friction force, the tread surface begins to skid. At the rear end of the contact surface including the point C of FIG. 2, the tread surface leaves the road surface and is restored to the original state. A side force Fy generated over the entire contact surface is the product of the lateral deformation area (hatched area in FIG. 2) of a tread portion of the tire and the lateral elastic coefficient per unit area of the tread portion. As shown in FIG. 2, the point of application of the side force Fy is located rearward (leftward in FIG. 2) by en (pneumatic trail) from a point (point 0) located directly under the tire axis. Therefore, the moment Fy·en at this time is a self-aligning torque (Tsa) and acts in a direction for reducing the skid angle $\alpha$.

Next, the behavior of a tire attached to a vehicle will be described with reference to FIG. 3, which is a simplified view of the situation depicted in FIG. 2. Usually, in order to facilitate restoration of the steering wheel, a caster angle is imparted to a vehicular wheel to be steered to thereby provide a caster trail ec. Thus, the point of contact with the road surface of the wheel becomes a point O' The moment acting to restore the steering wheel becomes Fy·(en+ec).

When the lateral grip condition of the tire deteriorates with a resultant increase in the area of a slip region, the lateral deformation of the tread portion of the tire changes in shape from the shape ABC to the shape ADC in FIG. 3. As a result, the point of application of the side force Fy shifts frontward with respect to the running direction of the vehicle (from the point H to the point J in FIG. 3). In other words, the pneumatic trail en is reduced. Thus, under application of a given side force Fy, in the case where the adhesive region is large, and thus the slip region is small (i.e., the degree of lateral grip of the tire is high), the pneumatic trail en increases, and thus the self-aligning torque Tsa increases. By contrast, in the case where the lateral grip of the tire is lost, and thus the slip region increases, the pneumatic trail en decreases, and thus the self-aligning torque Tsa decreases.

Thus, on the basis of a change in the pneumatic trail en, the degree of lateral grip of the tire can be detected. Since the self-aligning torque Tsa reflects a change in the pneumatic trail en, the grip factor, which indicates the degree of lateral grip of the front wheel, can be estimated on the basis of the self-aligning torque Tsa.

As is apparent from FIGS. 2 and 3, the self-aligning torque in relation to a side force acting on the front right wheel FRW exhibits the characteristic represented by Tsaa in FIG. 8. When Tsaa represents the actual self-aligning torque, and Fyf represents a side force serving as a front wheel index, Tsaa=Fyf·(en+ec). Thus, the nonlinear characteristic of the actual self-aligning torque Tsaa in relation to the side force Fyf directly represents a change in the pneumatic trail en. Hence, an inclination K1 of the actual self-aligning torque Tsaa as measured near the origin 0 in relation to the side force Fyf (where the tire is in grip condition) is identified; i.e., a self-aligning torque characteristic in complete grip condition (characteristic of reference self-aligning torque Tsa0) is obtained. The initial value of the inclination K1 is an experimentally obtained, predetermined value. Preferably, during normal running, during which the grip factor is high, the inclination K1 that assumes the initial value is corrected as appropriate. The actual self-aligning torque Tsaa is calculated as described later.

The grip factor $\epsilon$ of the wheel is estimated on the basis of the reference self-aligning torque Tsa0 and the actual self-aligning torque Tsaa. For example, when the side force is Fyf1, the reference self-aligning torque Tsa0 assumes a value of Tsa01 (=K1·Fyf1), and the actual self-aligning torque Tsaa assumes a value of Tsaa1, the grip factor $\epsilon$ is obtained as $\epsilon$=Tsaa1/Tsa01.

As described above, the grip factor of the wheel can be estimated on the basis of a change in self-aligning torque (actual self-aligning torque Tsaa) in relation to the side force Fyf.

Action of Configuration Adapted to Estimate Grip Factor

First, as shown in FIG. 5, steering-torque detection device M1 and assist torque detection device M2 are provided as steering-force index detection device. The steering-force index detection device detects at least one (for example, steering torque) of steering-force indexes including steering torque and steering force, which are applied to the steering system of a vehicle ranging from a steering wheel (not shown) to suspension (not shown). On the basis of the results of detection by these device, the reaction torque detection device M3 detects reaction torque, which is input to the self-aligning torque estimation device M6. Specifically, the steering torque sensor TS serves as the steering-torque detection device M1. The assist torque detection device M2 detects (estimates) assist torque on the basis of motor current detected by a motor current sensor provided in a motor drive circuit (not shown) for the electric motor of the EPS actuator FS.

On the basis of the result of detection by the assist torque detection device M2, the reaction torque detection device M3 detects reaction torque, which is input to the self-aligning torque estimation device M6. The steering angle sensor SS, which serves as steering-angle detection device M4 of FIG. 5, detects the steering angle θ. On the basis of the detected steering angle θ, the friction torque estimation device M5 estimates steering friction torque Tfrc (may be referred to merely as "friction torque"), which is input to the self-aligning torque estimation device M6. On the basis of the input reaction torque and friction torque, the self-aligning torque estimation device M6 estimates the actual self-aligning torque Tsaa, which is generated on the wheel.

In this case, self-aligning torque generated on the tires of the front wheels balances torque obtained by subtracting a friction component of the steering system from the sum of steering torque associated with steering operation and assist torque output from the EPS actuator FS. Thus, the actual self-aligning torque Tsaa is obtained as Tsaa=Teps−Tfrc, where Teps is torque output from the EPS actuator FS and is a value detected by the motor current sensor provided in the motor drive circuit (not shown) for the electric motor of the EPS actuator FS. Tfrc is a torque component (friction torque) caused by friction of the steering system. As mentioned above, Tfrc is a friction component of the steering system and a torque component caused by friction of the steering system. In the present embodiment, Tfrc is subtracted from Teps for correction, to thereby obtain the actual self-aligning torque Tsaa.

The above-mentioned correction method will be described with reference to FIG. 9. When the vehicle is running straight, the actual reaction torque (Teps) is zero. When the driver starts steering operation by turning the steering wheel SW, actual reaction torque begins to be generated. At this time, first, torque to cancel Coulomb friction of the steering system is generated. Next, the front wheels (tires) begin to be turned, and thus self-aligning torque begins to be generated.

In the initial stage where steering operation is initiated in the straight running state, as represented by the segment O-A of FIG. 9, self-aligning torque is not generated in relation to an increase in actual reaction torque. Thus, an estimated value of self-aligning torque is output as the actual self-aligning torque Tsaa that increases, along a slight inclination, with actual reaction torque (strictly speaking, the actual self-aligning torque Tsaa is a corrected, estimated value, but the term "estimated" is omitted). When the steering wheel SW is turned further incrementally, and thus actual reaction torque falls outside the friction torque region, the actual self-aligning torque Tsaa is output along the segment A-B of FIG. 9. When the steering wheel SW is turned back in the returning direction, and thus actual reaction torque decreases, the actual reaction torque Tsaa is output in such a manner as to decrease with actual reaction torque along a slight inclination as represented by the segment B-C of FIG. 9. As in the case where the steering wheel SW is turned further incrementally, when actual reaction torque falls outside the friction torque region, the actual self-aligning torque Tsaa is output along the segment C-D of FIG. 9.

Next, side force estimation device M9 will be described.

The side force estimation device M9 receives detection signals from lateral acceleration detection device M7 and yaw rate detection device M8, which serve as vehicle behavioral-quantity detection device. In the present embodiment, the lateral acceleration sensor 35 serves as the lateral acceleration detection device M7, and the yaw rate sensor 33 serves as the yaw rate detection device M8.

On the basis of detection signals from the lateral acceleration detection device M7 and the yaw rate detection device M8, the side force estimation device M9 estimates the side force Fyf acting on the front wheels. Specifically, on the basis of outputs from the lateral acceleration detection device M7 and the yaw rate detection device M8, the side force Fyf is estimated as Fyf=(Lr·m·Gy+Iz·dγ/dt)/L, where Lr is distance between the center of gravity and the rear axle; m is mass of the vehicle; L is wheel base; Iz is yawing moment of inertia; Gy is lateral acceleration; and dγ/dt is a value obtained by differentiating the yaw rate with respect to time.

The side force estimation device M9 corresponds to front-wheel index estimation device.

The self-aligning torque gradient-at-origin estimation device M10 estimates the gradient of self-aligning torque as measured near the origin. Specifically, on the basis of the actual self-aligning torque Tsaa estimated by the self-aligning torque estimation device M6 and the side force Fyf estimated by the side force estimation device M9, the self-aligning torque gradient-at-origin estimation device M10 estimates the self-aligning torque gradient-at-origin K1, which is the gradient of self-aligning torque as measured near the origin in FIG. 8.

On the basis of the self-aligning torque gradient-at-origin K1 and the side force Fyf, the reference self-aligning torque setting device M11 calculates the reference self-aligning torque Tsa0 as Tsa0=K1·Fyf.

On the basis of the reference self-aligning torque Tsa0 and the actual self-aligning torque Tsaa, the grip factor estimation device M12 estimates the grip factor $\epsilon$ as $\epsilon$=Tsaa/Tsa0.

Optimal-Distribution Processing Section 42

An optimal-distribution processing section 42 uses, as a vehicle-control target value, the yaw rate difference $\Delta\gamma$ calculated by the target-value calculation section 40 and optimally distributes the vehicle-control target value among the steering system, the drive system, and the brake system on the basis of the grip factor $\epsilon$ of the front wheel estimated in the grip factor calculation section 41.

Distribution ratios for the steering, drive, and brake systems to be used in optimal distribution processing are stored in the ROM in the form of map. The map is prepared beforehand by device of a test or the like such that the distribution ratios vary in accordance with the magnitude of the absolute value of the yaw rate difference $\Delta\gamma$ and whether the yaw rate difference $\Delta\gamma$ is positive or negative, and such that, for example, when the grip factor is below a predetermined threshold value, the grip factor is increased. The optimal-distribution processing section 42 performs optimal distribution processing on the basis of the map. Specifically, the distribution ratio is calculated in accordance with the grip factor. On the basis of the calculated distribution ratio, vehicle-control target values for the steering, drive, and brake systems are calculated. In other words, as a result of optimal distribution processing, the optimal-distribution processing section 42 generates a vehicle-control target value for the drive system, a vehicle-control target value for the brake system, and a vehicle-control target value for the steering system in equal number to objects of control. The generated vehicle-control target values are output to adders a1 to a3 as instruction values. Hereinafter, an instruction value for the drive system is called a "control instruction value At," a control value for the brake system is called a "control instruction value Bt," and an instruction value for the steering system is called a "control instruction value Ct." In the present embodiment, the number of objects of control is one each for the drive system and the steering system and four (wheel cylinders 24 to 27) for the brake system.

The optimal-distribution processing section 42 corresponds to distribution-ratio-setting device.

Drive Control Section 43

A drive control section 43 of the drive system shown in FIG. 4 functions as follows. A known control parameter for judging the behavioral condition of the vehicle 1 is input to the drive control section 43. On the basis of the control parameter, the drive control section 43 sets a control instruction value Aw and outputs the control instruction value Aw to the adder a1. Examples of the control parameter include the vehicle speed V, the wheel speeds Vfr, Vfl, Vrr, and Vrl, and the throttle opening of the engine EG based on the stepping-on measurement of the accelerator pedal AP. The adder a1 adds the control instruction value Aw and the control instruction value At and outputs the obtained sum (Aw+At), as a new control instruction value, to the drive circuit section 46 of the drive force distribution unit 7. On the basis of the new control instruction value (Aw+At), the drive circuit section 46 supplies the electromagnetic solenoid (not shown) of the drive power distribution unit 7 with current corresponding to the control instruction value (Aw+At), thereby adjusting the frictional engagement force between the clutch discs. As a result, the drive force distribution unit 7 distributes drive power corresponding to the control instruction value (Aw+At) to the rear wheels, thereby transmitting torque to the rear right wheel RRW and the rear left wheel RLW.

Since drive power is distributed between the front wheels and the rear wheels in accordance with a control instruction value that improves the grip factor, a wheel whose grip factor is the lowest among the wheels is improved in the grip factor, thereby ensuring running stability.

Braking Control Section 44

A braking control section 44 of the brake system shown in FIG. 4 functions as follows. A known control parameter for braking the vehicle 1 is input to the braking control section 44. On the basis of the control parameter, the braking control section 44 calculates the individual brake fluid pressures of the wheel cylinders 24 to 27. Control instruction values Bw for generating the corresponding brake fluid pressures are output to the corresponding adders a2. Examples of the control parameter include the vehicle speed V, the wheel speeds Vfr, Vfl, Vrr, and Vrl, and a stepping-on measurement detected by the brake stepping-on-force sensor BS.

In FIG. 4, for the sake of convenience, only a single adder a2 and a single drive circuit section 47 are representatively illustrated. In actuality, adders a2 and drive circuit sections 47 are provided in equal number with the wheel cylinders 24 to 27. As will be described later, the adders a2 output corresponding control instruction values to the corresponding drive circuit sections 47, and the drive circuit sections 47 cause the corresponding wheel cylinders 24 to 27 to be driven. The below description will representatively discuss a single object of control.

The adder a2 adds the control instruction value Bw and the control instruction value Bt and outputs the obtained sum (Bw+Bt), as a new control instruction value, to the drive circuit section 47 for a solenoid valve of the hydraulic circuit 28. On the basis of the new control instruction value (Bw+Bt), the drive circuit section 47 controls the solenoid valve of the hydraulic circuit 28, thereby controlling the brake fluid pressure of the corresponding wheel cylinder 24, 25, 26, or 27. As a result, the wheel cylinder 24, 25, 26, or 27 brakes the corresponding wheel in accordance with the control instruction value (Bw+Bt).

As a result, by device of braking any appropriate wheel, a wheel whose grip factor is the lowest among the wheels is improved in the grip factor, thereby ensuring running stability.

Steering Control Section 45

The steering control section 45 shown in FIG. 4 functions as follows. A known control parameter for judging the behavioral condition of the vehicle 1 is input to the steering control section 45. On the basis of the control parameter, the steering control section 45 sets a control instruction value Cw and outputs the control instruction value Cw to the adder a3. Examples of the control parameter include the steering angle $\theta$, the vehicle speed V, the wheel speeds Vfr, Vfl, Vrr, and Vrl, and a detection signal (steering angle signal) indicative of the steering angle of each wheel.

The steering control section 45 calculates a target position (target steering angle) of the wheel corresponding to the steering angle $\theta$ and the vehicle speed V. On the basis of the difference between the target position and the actual steering angle $\delta$, the steering control section 45 generates a control instruction value required for steering. The steering control section 45 outputs, to the adder a3, the control instruction value Cw corresponding to the calculated target steering angle. The adder a3 adds the control instruction value Cw and the control instruction value Ct and outputs the obtained sum (Cw+Ct), as a new control instruction value, to the drive circuit section 48 for the electric motor of the IFS actuator FSV. On the basis of the new control instruction value (Cw+Ct), the drive circuit section 48 supplies the IFS actuator FSV with current corresponding to the control instruction value (Cw+Ct), thereby imparting the target steering angle to the front wheels.

FIG. 7 is a control flowchart that the electronic control unit 11 of the present embodiment follows for execution of control.

In step S100, the electronic control unit 11 performs initialization. In step S200, the electronic control unit 11 receives detection signals from various sensors, and communication signals from other control units (not shown). In step S300, the target-value calculation section 40 calculates a target vehicle behavioral-quantity; i.e., the target yaw rate $\gamma^*$. In step S400, the target-value calculation section 40 calculates the yaw rate difference $\Delta\gamma$ between the actual yaw rate $\gamma$ and the target yaw rate $\gamma^*$ as a vehicle-control target value. In step S500, the grip factor calculation section 41 estimates the grip factor $\epsilon$. In step S600, the optimal-distribution processing section 42 performs optimal distribution processing for distribution of the vehicle-control target value among actuators and generates the control instruction values At, Bt, and Ct. In step S700, the electronic control unit 11 outputs the control instruction values for the steering, brake, and drive systems to the actuators of the systems and then returns to step S200.

Change of Distribution Ratio for Distribution of Vehicle-Control Target Value Among Three Systems Changing the distribution ratio for distribution of the vehicle-control target value among the above-mentioned three systems by use of the grip factor will be specifically described.

The present embodiment is applied to a front-wheel-steering vehicle. In execution of control along the above-mentioned flowchart, when the current estimated value of the grip factor $\epsilon$ of the front wheel drops below the last estimated value, the allocation of the vehicle-control target value for the steering system is lowered, whereas that for the drive system and that for the brake system are increased. Specifically, the control instruction value Ct for the steering system becomes smaller than the last control instruction value Ct, whereas the control instruction value At for the drive system and the control instruction value Bt for the brake system become greater than the last values At and Bt, respectively.

In the case where the vehicle is running at a given vehicle speed V, the steering angle of the IFS actuator FSV becomes small, so that even when the steering angle of the steering wheel SW is large, the front wheels are steered to a small extent. Since the control instruction value At for the drive system increases, the distribution of drive force to the rear wheels increases. Furthermore, since the control instruction value Bt for the brake system becomes greater than the last control instruction value Bt, the braking force increases. As a result, the rear wheels, which have a margin in terms of the grip factor, are effectively used, thereby improving the running stability of the vehicle.

An embodiment is characterized by the following:

(1) The electronic control unit 11 serves as the target vehicle behavioral-quantity calculation device and calculates the target yaw rate $\gamma^*$ (target vehicle behavioral-quantity) in accordance with the vehicle speed V and the steering angle $\theta$. The electronic control unit 11 serves as the vehicle-control target value calculation device and calculates the yaw rate difference $\Delta\gamma$ (vehicle-control target value) on the basis of the target yaw rate $\gamma^*$ and the actual yaw rate $\gamma$. The electronic control unit 11 serves as estimation device and estimates the grip factor $\epsilon$ indicative of the grip factor of the front wheel to the road surface. The electronic control unit 11 serves as the distribution-ratio-setting device and sets the distribution ratio for distribution of the vehicle-control target value among the actuators of the steering, brake, and drive systems in accordance with the estimated grip factor $\epsilon$. The electronic control unit 11 serves as the control device and controls the actuators of the three systems in accordance with the vehicle-control target value distributed at the set distribution ratio; i.e., in accordance with the control instruction values At, Bt, and Ct.

Figure 11:
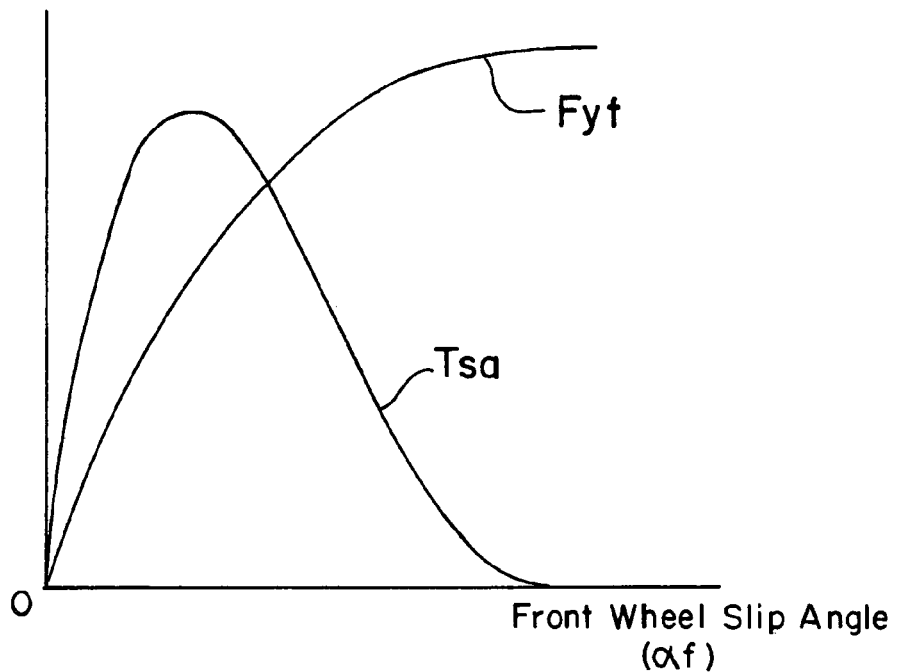
FIG. 11 is a graph showing the relation of wheel side force and self-aligning torque with slip angle.
Figure 12:
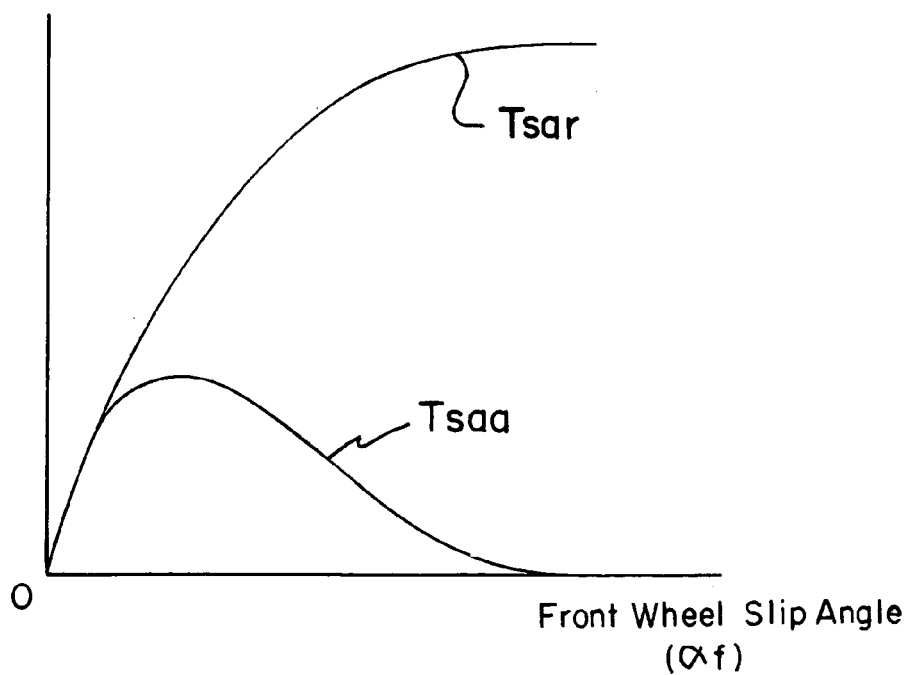
FIG. 12 is a graph showing the relation of self-aligning torque with slip angle.

Particularly, in the present embodiment, the state of the road surface is estimated without use of the friction coefficient of the road surface; in other words, the state of the road surface is estimated from the relation of the grip factor with self aligning torque. Therefore, the present embodiment can estimate the state of the road surface with higher accuracy and robustness than in the case of the conventional method in which the state of the road surface is estimated from tire margin, which is obtained by use of the friction coefficient of the road surface, estimation of the friction coefficient with high accuracy and estimation of an instantaneous change in the friction coefficient being difficult. FIG. 11 is a characteristic diagram showing the relation of self-aligning torque and wheel side force with front-wheel slip angle. As shown in FIG. 11, the self-aligning torque Tsa exhibits a peak at a smaller slip angle than does the side force Fyf. Therefore, since the lowering of grip of the tire can be identified before the critical region of the vehicle is reached, the vehicle-control target value can be optimally distributed among the actuators, thereby improving the running stability of the vehicle.

(2) The drive system has the drive force distribution unit 7 for distributing drive force between the front wheels and the rear wheels, and the electronic control unit 11 (control device) controls an unillustrated electromagnetic solenoid (actuator) contained in the drive force distribution unit 7.

As a result, by device of changing distribution of drive force between the front wheels and the rear wheels, even in the case of a configuration in which the electromagnetic solenoid of the drive force distribution unit 7 serves as an actuator of the drive system, the actions and effects described above in (1) can be yielded.

Another embodiment of the present invention will next be described with reference to FIGS. 10 to 15. In this embodiment and subsequent embodiments, configurational features identical with or equivalent to those of the above embodiment are denoted by common reference numerals, and repeated description thereof is omitted; and different features are mainly described. This embodiment differs from the previous embodiment only in the method of estimating the grip factor in the electronic control unit 11. In other words, this embodiment estimates the grip factor $\epsilon$ while using the slip angle of the front wheel as a front wheel index.

Figure 10:
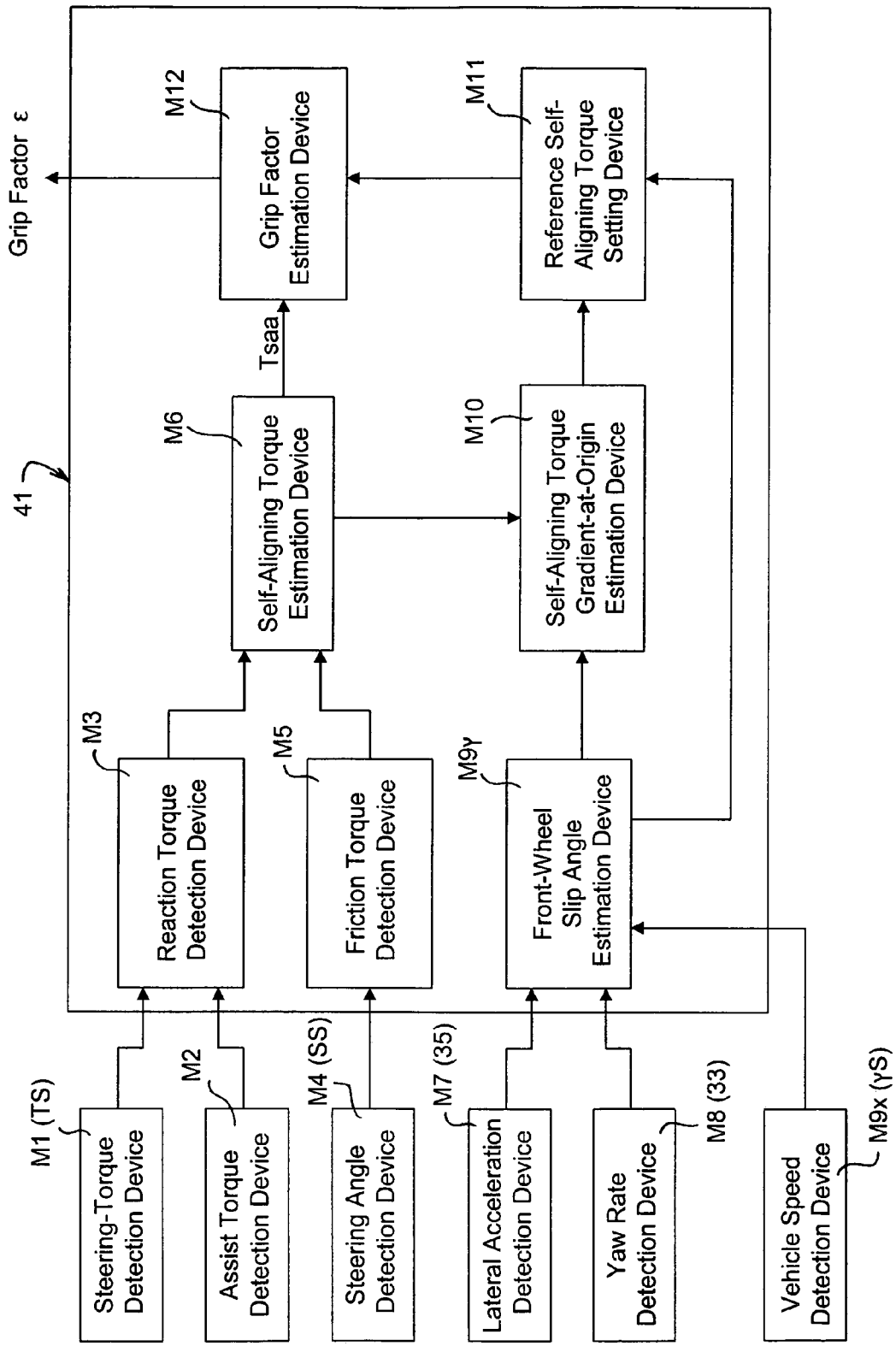
FIG. 10 is a block diagram of a grip factor calculation section, which estimates a grip factor from slip angle and self-aligning torque, in another embodiment of the present invention.

FIG. 10 is a block diagram of the grip factor calculation section 41, which estimates the grip factor from the slip angle of the front wheel and self-aligning torque. The steering-torque detection device M1, the assist torque detection device M2, the reaction torque detection device M3, the steering-angle detection device M4, the friction torque estimation device M5, and the self-aligning torque estimation device M6 are similar to those of the above embodiment.

Reaction torque and friction torque are calculated, and self-aligning torque is estimated. The slip angle of the front wheel is obtained on the basis of the steering angle θ, the actual yaw rate γ, the actual lateral acceleration Gy, and the vehicle speed V. Thus, as in the case of the previous embodiment, detection signals from the steering-angle detection device M4, the lateral acceleration detection device M7, and the yaw rate detection device M8, together with a detection signal from the vehicle speed detection device M9x, are input to front-wheel slip estimation device M9y, which corresponds to the front-wheel index estimation device. In the present embodiment, a vehicle speed sensor (not shown) serves as the vehicle speed detection device M9x.

The steering-angle detection device M4, the lateral acceleration detection device M7, the yaw rate detection device M8, and the vehicle speed detection device M9x correspond to the vehicle behavioral-quantity detection device for detecting the behavioral quantity of the vehicle.

In the front-wheel slip estimation device M9y, first, a body slip angular-speed dβ/dt is obtained on the basis of the actual yaw rate γ, the actual lateral acceleration Gy, and the vehicle speed V. The obtained body slip angular-speed dβ/dt is integrated, thereby yielding the vehicle-body slip angle β. On the basis of the vehicle-body slip angle β, the front-wheel slip angle αf is calculated by use of the vehicle speed V, the steering angle θ, and vehicular dimensions. Notably, the vehicle-body slip angle β can be estimated by use of a vehicle model. Also, the vehicle-body slip angle β can be calculated by combined use of the integration method and the modeling method.

On the basis of the above-estimated self-aligning torque and front-wheel slip angle αf, the self-aligning torque gradient-at-origin estimation device M10 identifies the gradient of self-aligning torque near the origin. On the basis of the obtained gradient and the front-wheel slip angle, the reference self-aligning torque setting device M11 sets a reference self-aligning torque. On the basis of the result of comparison between the reference self-aligning torque set by the reference self-aligning torque setting device M11 and the self-aligning torque estimated by the self-aligning torque estimation device M6, the grip factor estimation device M12 estimates the grip factor ε of the front wheel.

The above-mentioned estimation of the grip factor ε will be described in detail with reference to FIGS. 11 to 15. As shown in FIG. 11, the relation of the front-wheel side force Fyf and the self-aligning torque Tsa with the front-wheel slip (hereinafter called the "front-wheel slip angle αf") exhibits a nonlinear characteristic in relation to the front-wheel slip angle αf. Since the self-aligning torque Tsa is the product of the front-wheel side force Fyf and the trail e (=en+ec), a self-aligning torque characteristic in the case of the front wheel being in grip condition; i.e., the pneumatic trail en being in complete grip condition, is nonlinear as represented by Tsar in FIG. 12.

Figure 13:
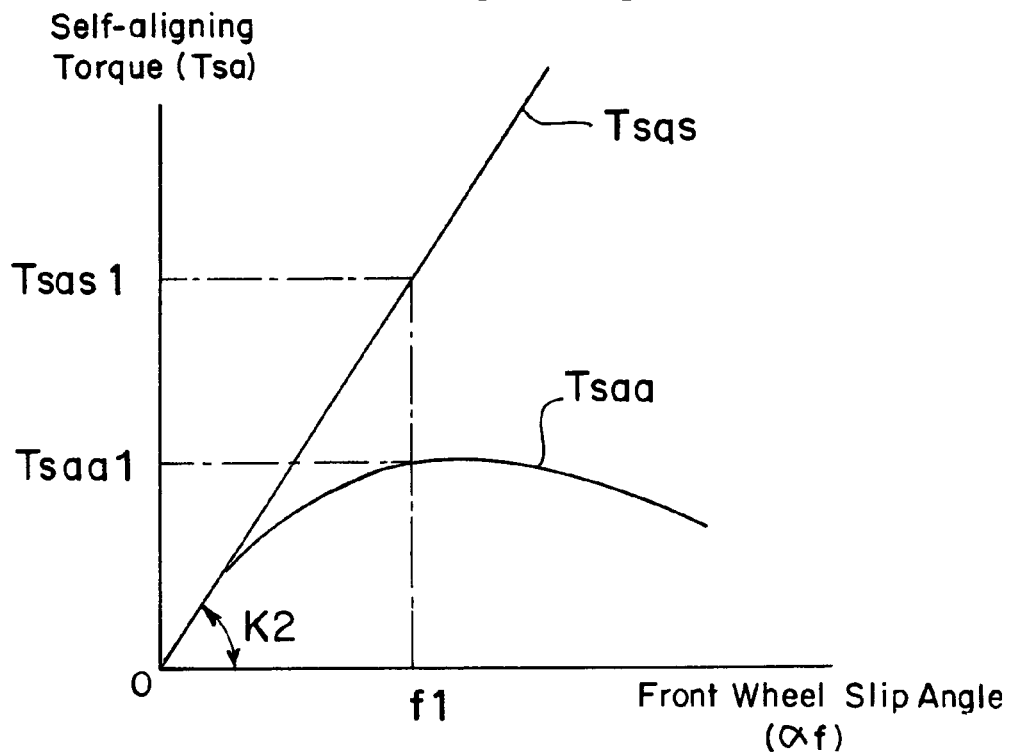
FIG. 13 is a graph showing the relation of self-aligning torque with slip angle.

However, in the present embodiment, a self-aligning characteristic in complete grip condition is assumed to be linear. As shown in FIG. 13, a gradient K2 of the self-aligning torque Tsa in relation to the front-wheel slip angle as measured in the vicinity of the origin is obtained, and a reference self-aligning torque characteristic (represented by Tsas in FIG. 13) is set. For example, when the front-wheel slip angle is αf1, the reference self-aligning torque is calculated as Tsas1=K2·αf1. The grip factor ε is obtained as ε=Tsaa1/Tsas1=Tsaa1/(K2·αf1).

Figure 14:
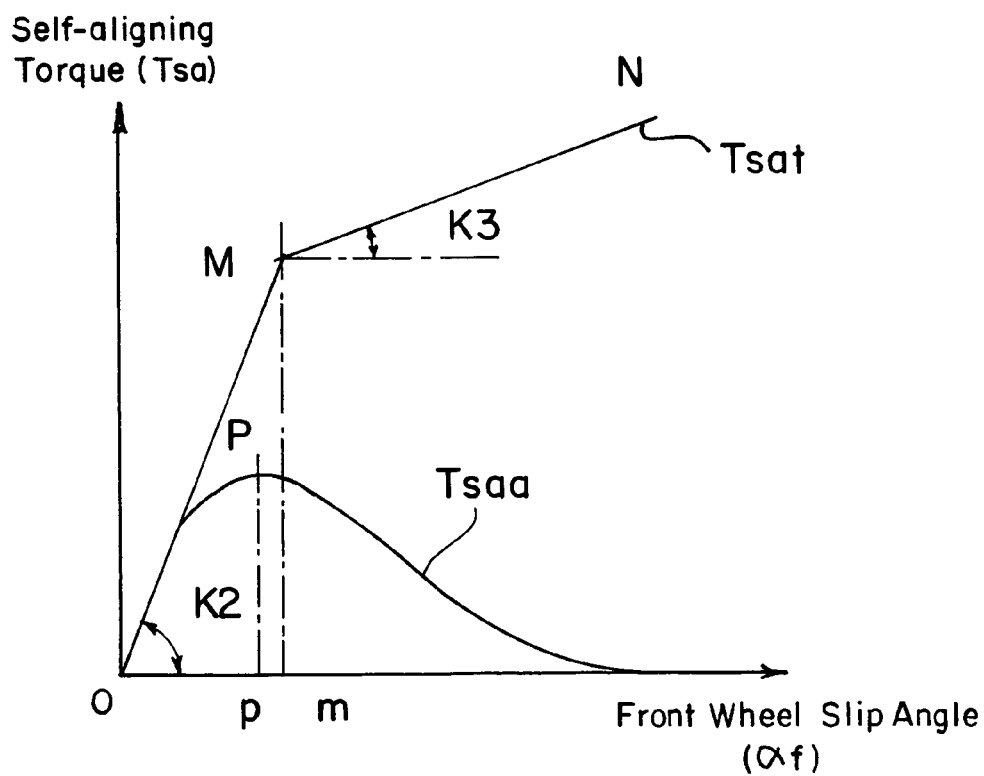
FIG. 14 is a graph showing the relation of self-aligning torque with slip angle.

The method of FIG. 13 for setting the reference self-aligning torque assumes the reference self-aligning torque characteristic to be linear. As a result, in a region where the front-wheel slip angle α·f is large, an error associated with estimation of the grip factor becomes large, possibly resulting in impaired accuracy in estimation of the grip factor. Therefore, preferably, as shown in FIG. 14, at a predetermined front-wheel slip angle or greater, the gradient of self-aligning torque is set to K3, whereby the nonlinear characteristic of the reference self-aligning torque is linearly approximated as represented by OMN in FIG. 14. In this case, preferably, the self-aligning torque gradient K3 is experimentally obtained and set beforehand, and, during running, the gradient K3 is identified and corrected. A point M is set on the basis of an inflection point (point P) of the actual self-aligning torque. For example, the inflection point P of the actual self-aligning torque is obtained. Then, a front-wheel slip angle αp corresponding to the inflection point P is obtained. A front-wheel slip angle that is greater by a predetermined value than the front-wheel slip angle αp is taken as αm. A point on the straight line of the gradient K3 that corresponds to the front-wheel slip angle am is set as the point M.

Figure 15:
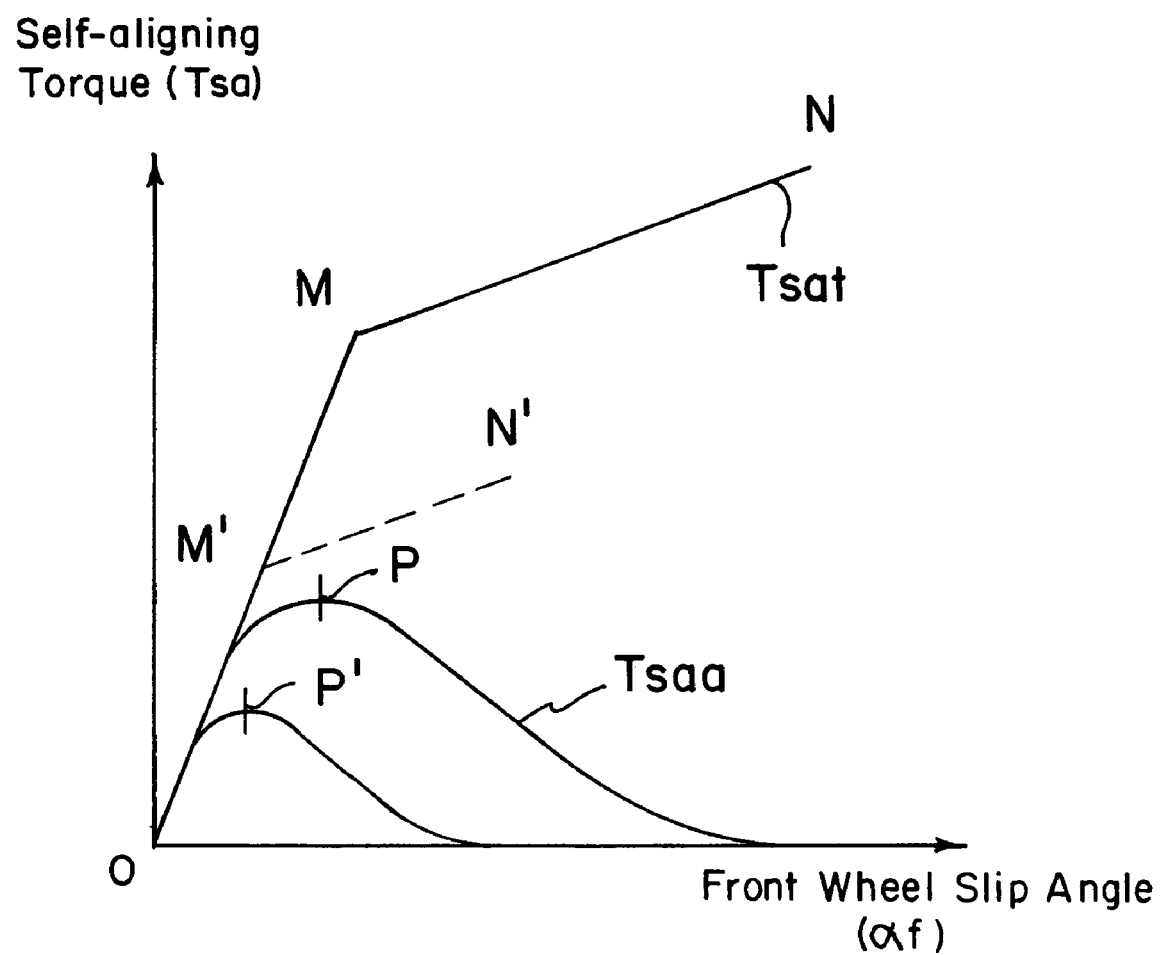
FIG. 15 is a graph showing the relation of self-aligning torque with slip angle.

Furthermore, since the characteristic of the reference self-aligning torque in relation to the front-wheel slip angle is influenced by friction coefficient μ of the road surface, as shown in FIG. 15, the reference self-aligning torque is set on the basis of the inflection point P of the actual self-aligning torque Tsaa, whereby a highly accurate reference self-aligning torque characteristic can be set. For example, when the friction coefficient of the road surface lowers, the characteristic of the actual self-aligning torque Tsaa changes from representation by the solid line to representation by the broken line in FIG. 15. Specifically, when the friction coefficient μ of the road surface lowers, the inflection point of the actual self-aligning torque Tsaa changes from the point P to a point P'. Therefore, the reference self-aligning torque characteristic (Tsat) must be changed from OMN to OM'N'. In this case, a point M' is set on the basis of the inflection point P'; thus, even when the friction coefficient of the road surface changes, the reference self-aligning torque characteristic can be set while following the change in the friction coefficient of the road surface.

This embodiment can yield actions and effects similar to those of the previous embodiment described above in (1) and (2).

Figure 16:
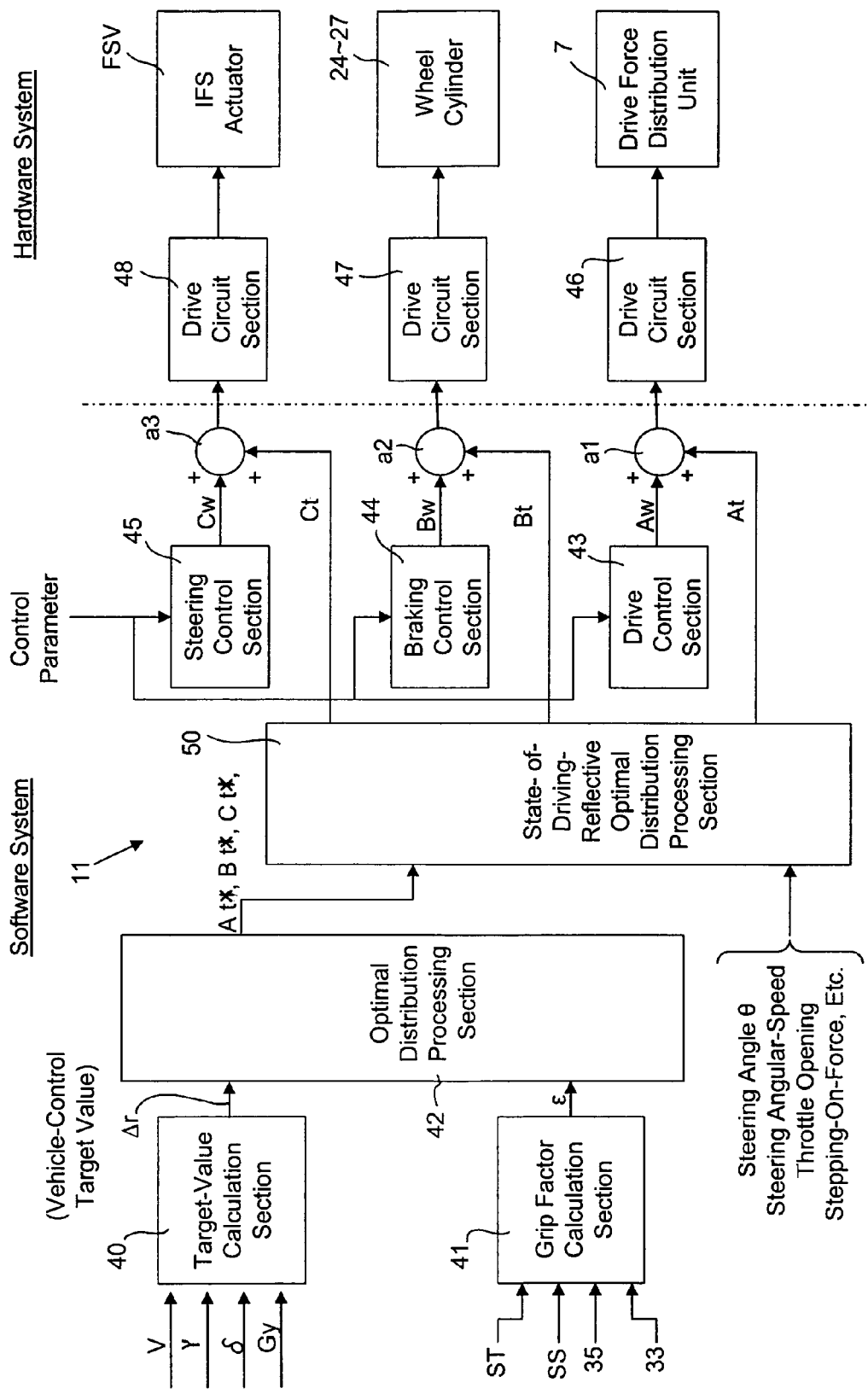
FIG. 16 is a control block diagram of an electronic control unit in an embodiment of the present invention.
Figure 17:
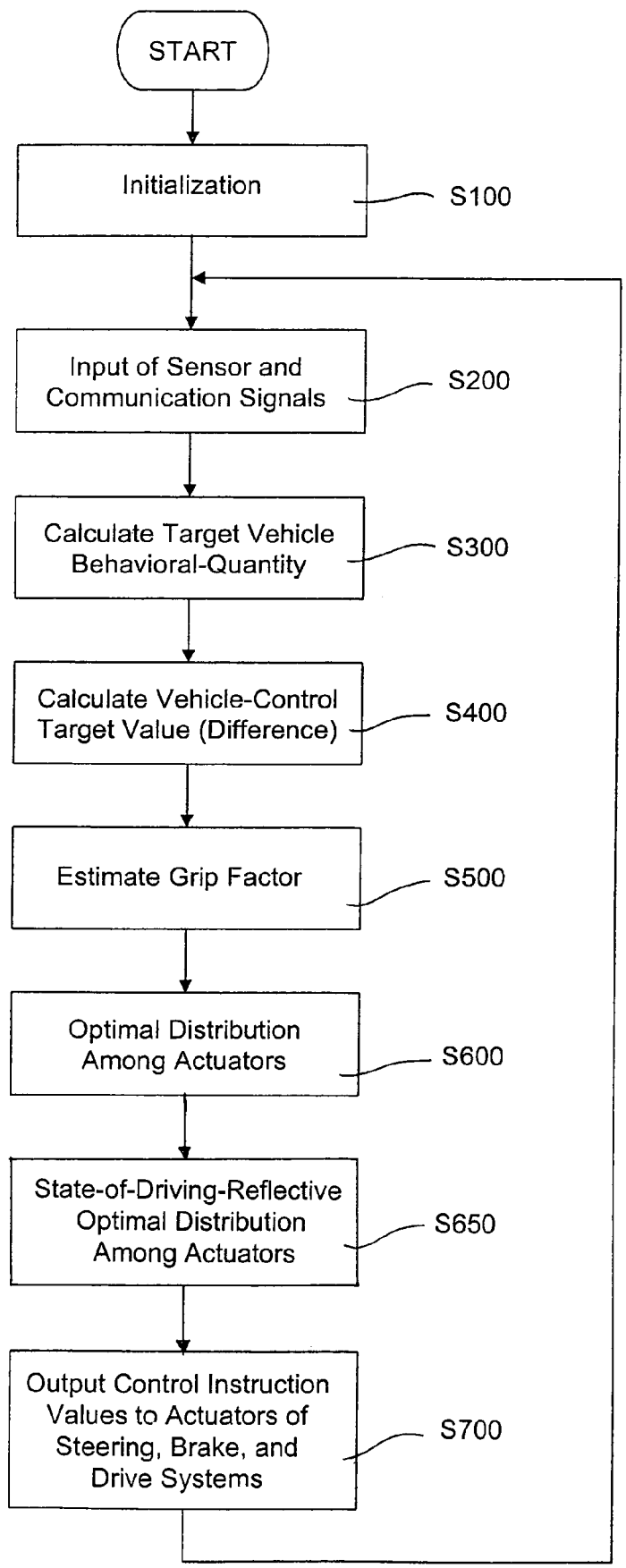
FIG. 17 is a control flowchart which the electronic control unit of the further embodiment follows for execution of control.
Figure 18:
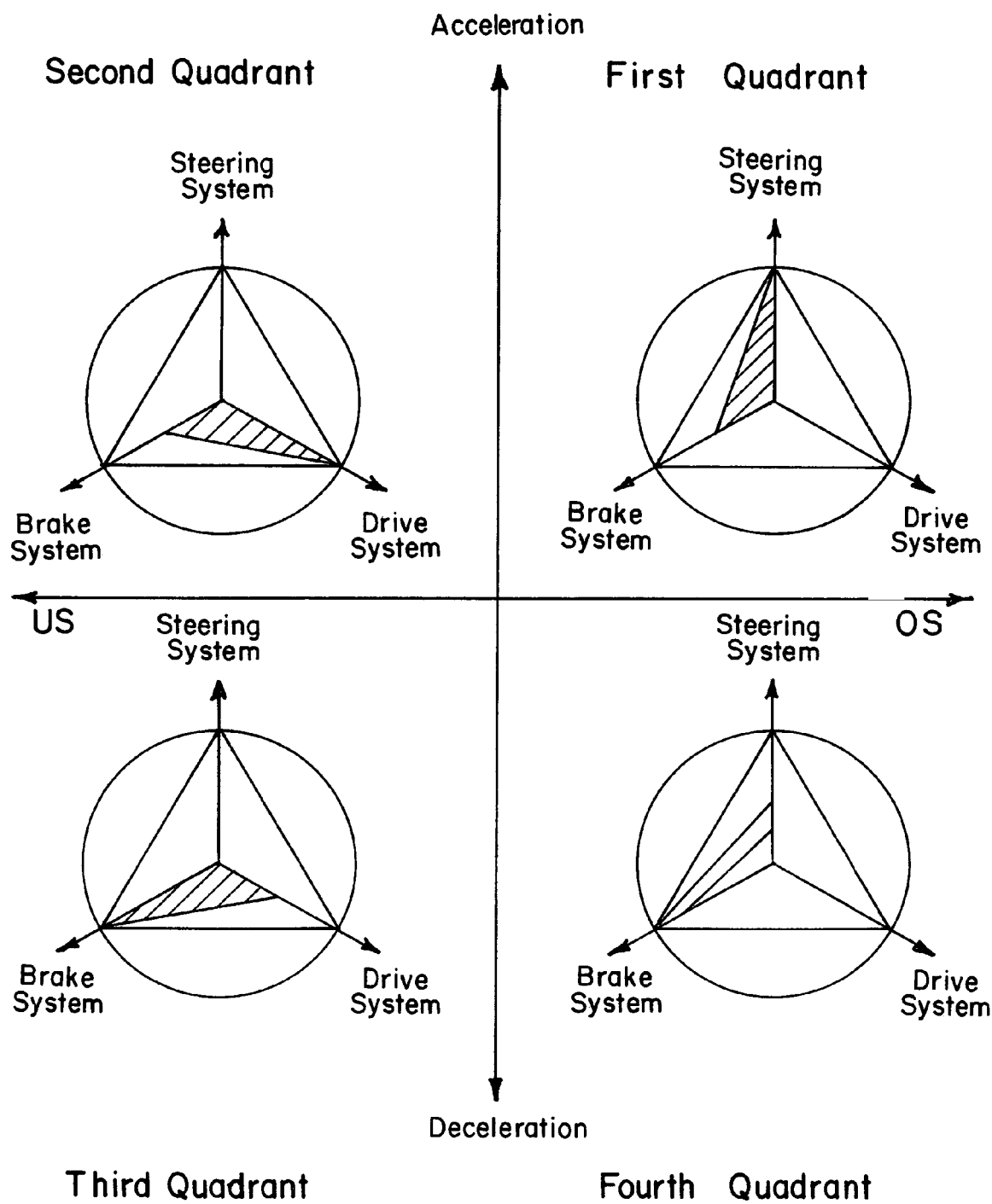
FIG. 18 is an imaginary diagram showing optimal distribution among a steering system, a brake system, and a drive system in accordance with the state of driving.

A further embodiment of the present invention will next be described with reference to FIGS. 16 to 18. FIG. 16 is a control block diagram of the electronic control unit 11; FIG. 17 is a control flowchart; and FIG. 18 is an imaginary diagram showing optimal distribution among the steering system, the brake system, and the drive system in accordance with the state of driving. This embodiment has the same hardware configuration as that of the previous embodiments and differs from this in the configuration of control blocks in the electronic control unit 11 as shown in FIG. 16. Referring to FIG. 16, the target-value calculation section 40, the grip factor calculation section 41, the drive control section 43, the braking control section 44, the steering control section 45, the adders a1 to a3, and the configuration of the hardware system are identical with those of the above embodiment, and thus repeated description thereof is omitted.

In the following embodiment, the optimal-distribution processing section 42 uses, as a vehicle-control target value, the yaw rate difference Δγ calculated by the target-value calculation section 40 and optimally distributes the vehicle-control target value among the steering system, the drive system, and the brake system on the basis of the grip factor ε of the front wheel estimated in the grip factor calculation section 41.

Distribution ratios for the steering, drive, and brake systems to be used in optimal distribution processing are stored in the ROM in the form of map. The map is prepared beforehand by device of a test or the like such that the distribution ratios vary in accordance with the magnitude of the absolute value of the yaw rate difference Δγ and whether the yaw rate difference Δγ is positive or negative, and such that, for example, when the grip factor is below a predetermined threshold value, the grip factor is increased. The optimal-distribution processing section 42 performs optimal distribution processing on the basis of the map. As a result of optimal distribution processing, the optimal-distribution processing section 42 generates a vehicle-control target value for the drive system, a vehicle-control target value for the brake system, and a vehicle-control target value for the steering system in equal number to objects of control. The generated vehicle-control target values are output to a state-of-driving-reflective optimal-distribution processing section 50 as instruction values. Hereinafter, an instruction value for the drive system is called a "control instruction value At*," a control value for the brake system is called a "control instruction value Bt*," and an instruction value for the steering system is called a "control instruction value Ct*." In the present embodiment, the number of objects of control is one each for the drive system and the steering system and four (wheel cylinders 24 to 27) for the brake system.

The control instruction value At* for the drive system, the control instruction value Bt* for the brake system, and the control instruction value Ct* for the steering system are input to the state-of-driving-reflective optimal-distribution processing section 50. Also, at least one of the steering angle θ, the steering angular-speed, the throttle opening, and the stepping-on force detected by the brake stepping-on-force sensor BS is input to the state-of-driving-reflective optimal-distribution processing section 50. The steering angular-speed is calculated by the electronic control unit 11 on the basis of the steering angle θ. In the present embodiment, the accelerator pedal AP corresponds to the driving-operation device, and the throttle opening corresponds to the driver's driving-operation quantity.

The state-of-driving-reflective optimal-distribution processing section 50 calculates a distribution ratio for distribution among the actuators of the steering, brake, and drive systems in accordance with the driving-operation quantity, on the basis of a state-of-driving-reflective optimal-distribution-ratio map stored beforehand in the ROM. Notably, the state-of-driving-reflective optimal-distribution-ratio map is prepared beforehand by device of a test or the like. The state-of-driving-reflective optimal-distribution-ratio map is set such that a distribution ratio calculated in the optimal-distribution processing section 42 is modified so as to reflect the driver's intention.

Thus, the state-of-driving-reflective optimal-distribution processing section 50 modifies the input control instruction values At*, Bt*, and Ct* on the basis of the state-of-driving-reflective optimal-distribution-ratio map so as to reflect at least any one of the steering angle θ, the steering angular-speed, the throttle opening, and the stepping-on force. That is, new control instruction values that reflect the driver's intention are input to the corresponding adders a1 to a3. The control instruction values At*, Bt*, and Ct* are modified to new control instruction values At, Bt, and Ct, respectively, and the values At, Bt, and Ct are input to the corresponding adders a1 to a3.

FIG. 17 is a control flowchart that the electronic control unit 11 of the present embodiment follows for execution of control.

In step S100, the electronic control unit 11 performs initialization. In step S200, the electronic control unit 11 receives detection signals from various sensors, and communication signals from other control units (not shown). In step S300, the target-value calculation section 40 calculates a target vehicle behavioral-quantity; i.e., the target yaw rate γ*. In step S400, the target-value calculation section 40 calculates the yaw rate difference Δγ between the actual yaw rate γ and the target yaw rate γ* The calculated yaw rate difference Δγ serves as a vehicle-control target value. In step S500, the grip factor calculation section 41 estimates the grip factor ε. In step S600, the optimal-distribution processing section 42 performs optimal distribution processing for distribution of the vehicle-control target value among actuators and generates the control instruction values At*, Bt*, and Ct*. In step S650, the state-of-driving-reflective optimal-distribution processing section 50 performs state-of-driving-reflective optimal-distribution processing and generates the control instruction values At, Bt, and Ct. In step S700, the electronic control unit 11 outputs the control instruction values for the steering, brake, and drive systems to the actuators of the systems and then returns to step S200.

Change of Distribution Ratio for Distribution of Vehicle-Control Target Value Between Two Systems The specific operation of the present embodiment will next be described with reference to FIG. 18.

In the case where the driver is stepping on the accelerator pedal AP when cornering, the vehicle is in a cornering acceleration condition (in the first-quadrant or second-quadrant condition of FIG. 18). In this case, the state-of-driving-reflective optimal-distribution processing section 50 lowers the allocation of the vehicle-control target value for the brake system. If the vehicular behavior exhibits an oversteer tendency (OS tendency); i.e., the vehicle is in the first-quadrant condition, the allocation for the steering system is increased. If the vehicular behavior exhibits an understeer tendency (US tendency); i.e., the vehicle is in the second-quadrant condition, the allocation for the drive system is increased. In this manner, the vehicle is controlled such that the vehicle stability is ensured while the accelerating condition is maintained to the greatest possible extent. In this manner, a distribution ratio for the vehicle-control target value is set in such a manner as to reflect the driver's intention.

In the example of a vehicular behavior in the first quadrant of FIG. 18, the actuator (the electromagnetic solenoid of the drive force distribution unit 7) in the drive system is not activated, so that the drive force distribution ratio between the front wheels and the rear wheels is 100:0. As a result, since the drive force is supplied only to the front wheels, the running stability of the vehicle can be improved. In the example of a vehicular behavior in the second quadrant of FIG. 18, the actuator (the electromagnetic solenoid of the drive force distribution unit 7) in the drive system is activated, so that the drive force distribution ratio between the front wheels and the rear wheels is 50:50. As a result, since the drive force is distributed between the front wheels and the rear wheels, the running stability of the vehicle can be improved.

In the case where the driver is not stepping on the accelerator pedal AP when cornering, the vehicle is in a cornering deceleration condition (in the third-quadrant or fourth-quadrant condition of FIG. 18). In this case, the state-of-driving-reflective optimal-distribution processing section 50 increases the allocation for the brake system. If the vehicular behavior exhibits an understeer tendency (US tendency); i.e., the vehicle is in the third-quadrant condition, the allocation for the drive system is increased. If the vehicular behavior exhibits an oversteer tendency (OS tendency); i.e., the vehicle is in the fourth-quadrant condition, the allocation for the steering system is increased. In this manner, the vehicle is controlled such that the vehicle stability is ensured while the decelerating force is increased. In this manner, the distribution ratio is set in such a manner as to reflect the driver's intention.

In the example of a vehicular behavior in the third quadrant of FIG. 18, the actuator (the electromagnetic solenoid of the drive force distribution unit 7) in the drive system is activated, and the frictional engagement force between the clutch discs is adjusted, so that the drive force is distributed at a predetermined distribution ratio between the front wheels and the rear wheels. As a result, since the drive force is distributed between the front wheels and the rear wheels, the running stability of the vehicle can be improved. In the example of a vehicular behavior in the fourth quadrant of FIG. 18, the actuator (the electromagnetic solenoid of the drive force distribution unit 7) in the drive system is not activated, so that the drive force distribution ratio between the front wheels and the rear wheels is 100:0. As a result, since the drive force is supplied only to the front wheels, the running stability of the vehicle can be improved.

In FIG. 18, the distribution ratio is set in the hatched regions.

As described above, the present embodiment can ensure the running stability of the vehicle while the driver's intention (to accelerate or decelerate) is reflected, thereby lessening the driver's feeling of wrongness or dissatisfaction.

This embodiment is characterized not only by yielding the actions and effects of the previous embodiment described above in (1) and (2) in the description of the first embodiment, but also by the following:

(1) This embodiment includes a device (accelerator sensor AS) for detecting throttle opening (driving-operation quantity) effected by the driver's operating the accelerator pedal or the like (driving-operation device) of the vehicle 1. The electronic control unit 11 (distribution-ratio-setting device) sets the distribution ratio for distribution of the vehicle-control target value among the actuators of at least two of the steering system, the brake system, and the drive system in accordance with throttle opening (driving-operation quantity) or the like and the grip factor $\epsilon$ of the front wheel. As a result, the distribution ratio for the vehicle-control target value is set in such a manner as to reflect the driver's intention, so that the running stability of the vehicle can be ensured while the driver's intention is reflected.

Figure 19:
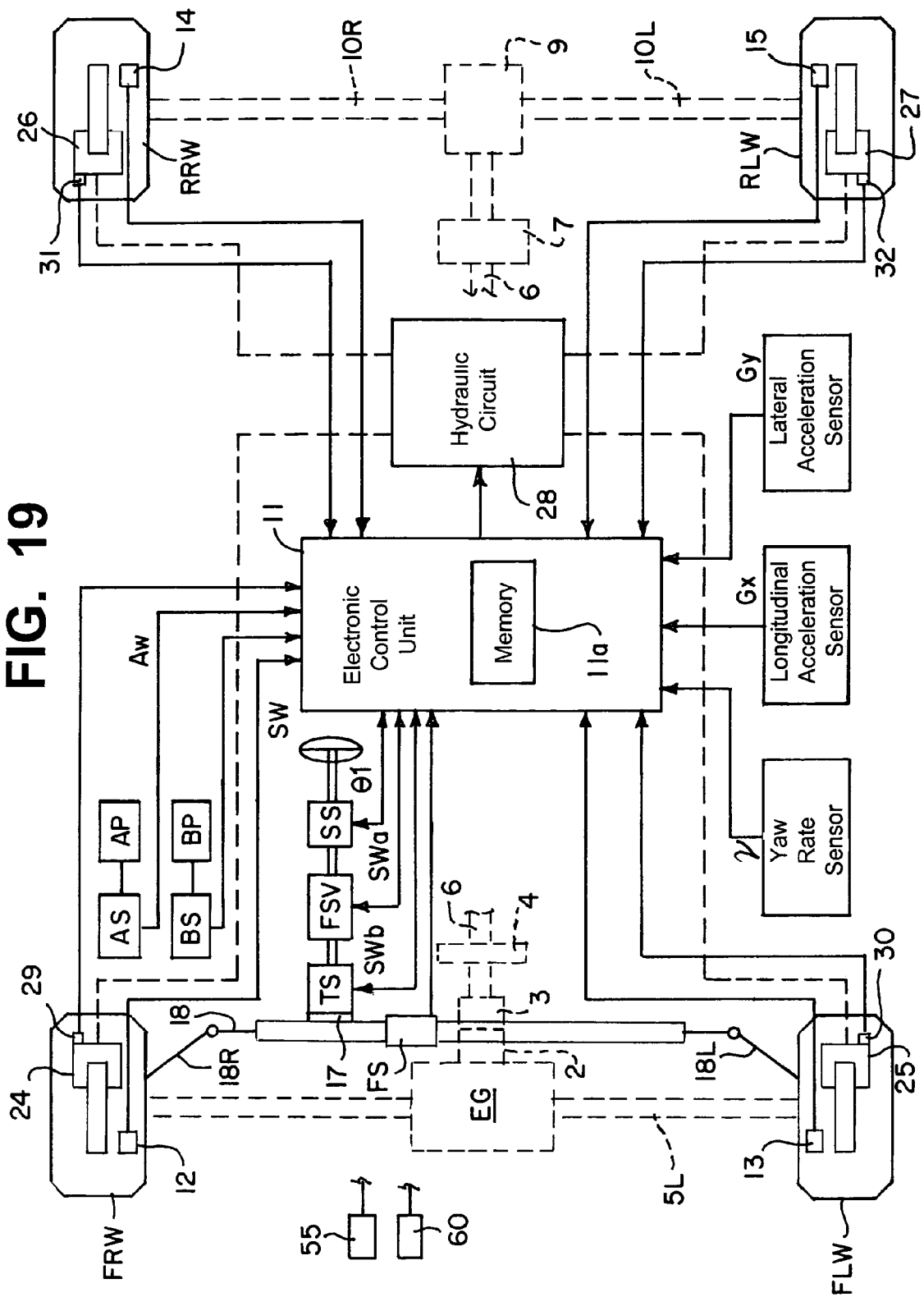
FIG. 19 is a schematic, configurational block diagram of an integrated control apparatus according to an embodiment of the present invention.
Figure 20:
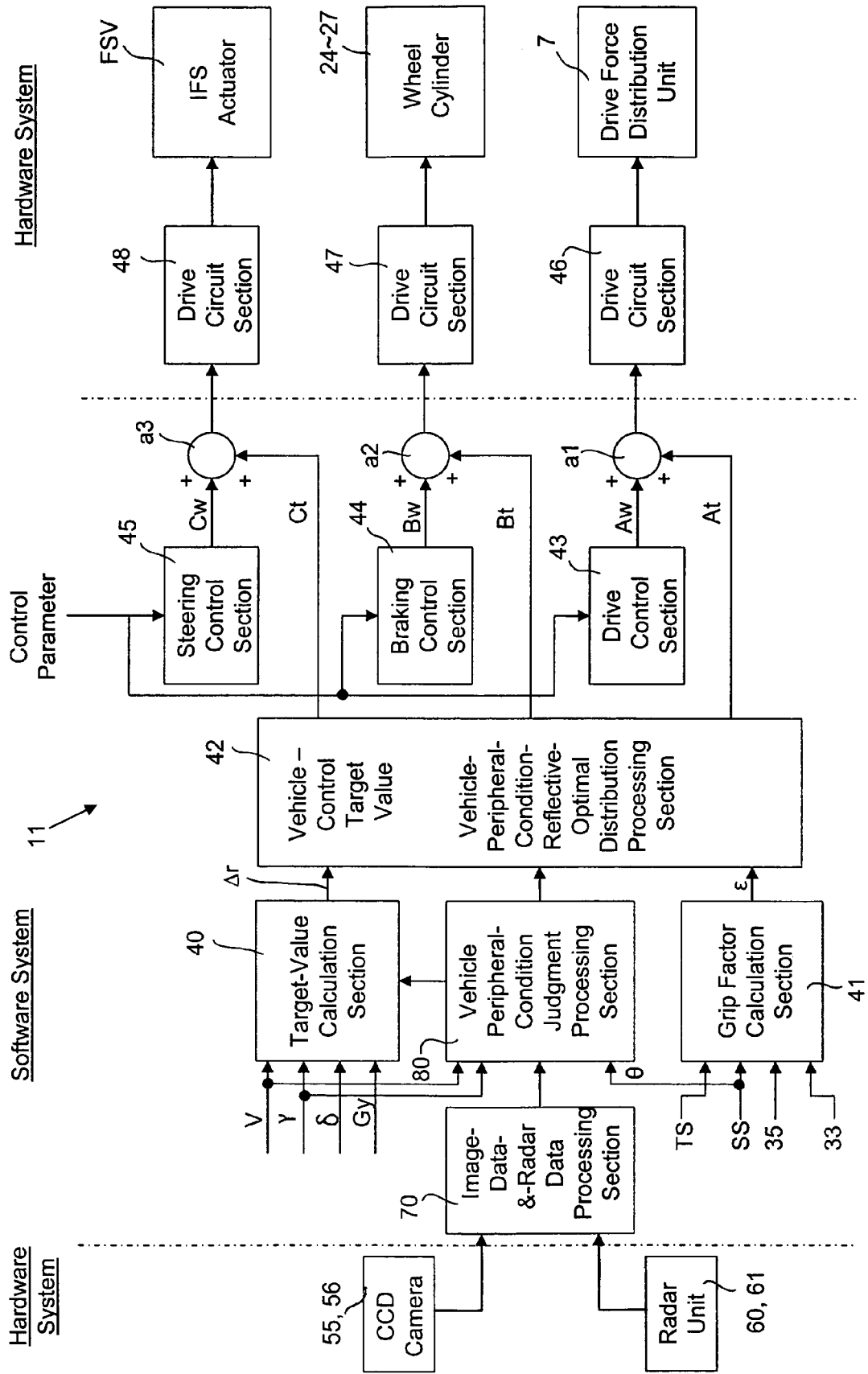
FIG. 20 is a control block diagram of an electronic control unit in another embodiment.
Figure 21:
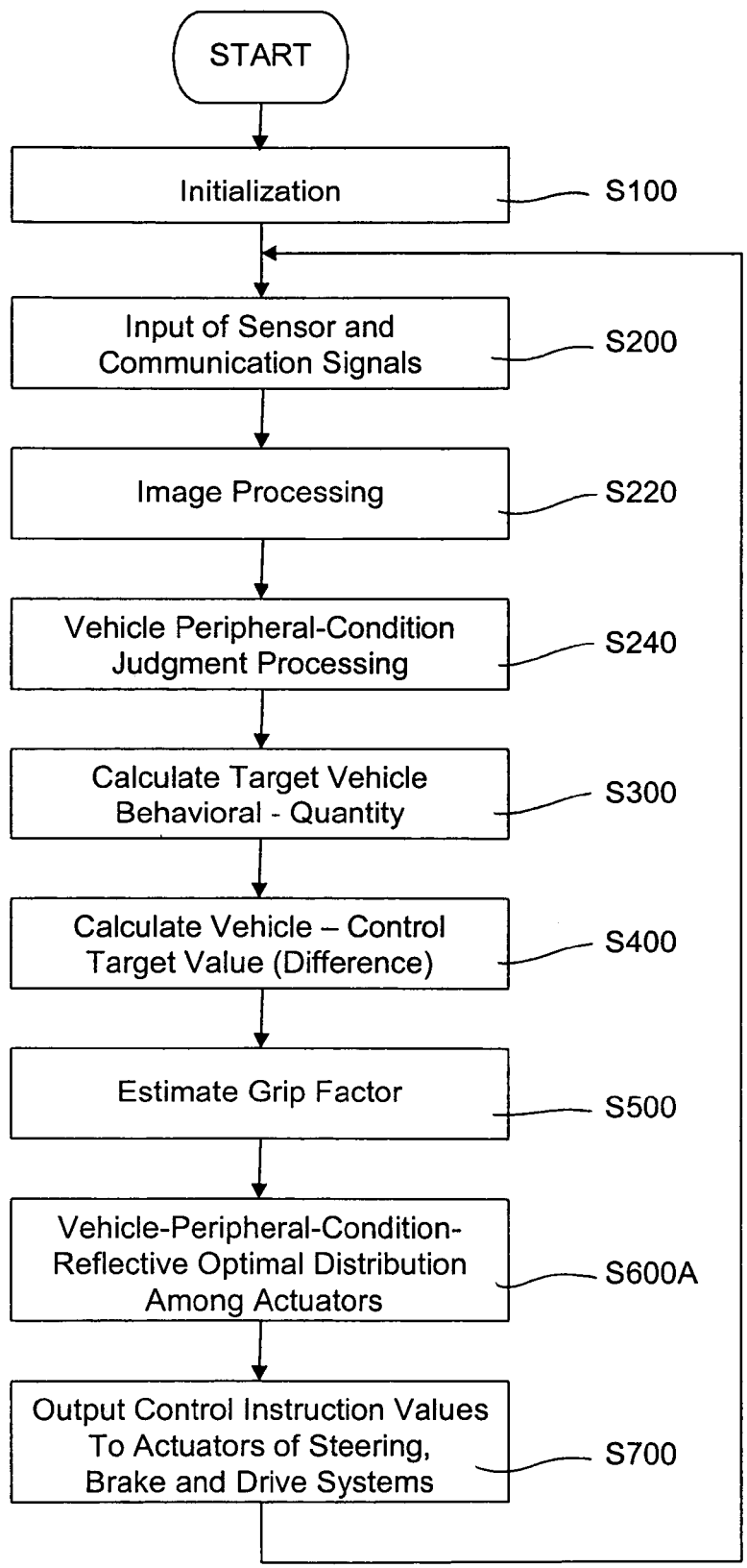
FIG. 21 is a control flowchart which the electronic control unit follows for execution of control.

A further embodiment of the present invention will next be described with reference to FIGS. 19 to 21. FIG. 19 is a schematic, configurational block diagram of an integrated control apparatus for a vehicle according to this embodiment; FIG. 20 is a control block diagram of the electronic control unit 11; and FIG. 21 is a control flowchart that the electronic control unit 11 follows for execution of control. In addition to the configuration of the previous embodiments, this embodiment includes CCD cameras 55 and 56, which serve as acquisition device and image capture device and are image capture devices for capturing a view viewed frontward of the vehicle 1 and a view viewed rearward of the vehicle 1. CCD is an acronym for Charge Coupled Device. The vehicle 1 has radar units 60 and 61 for detecting an object present ahead of the vehicle 1 and an object behind.

The radar units 60 and 61 serve as the acquisition device for acquiring a peripheral condition of the vehicle 1. The radar units 60 and 61 are known radar units that emit electromagnetic wave frontward and rearward in a predetermined laterally fanning-out condition and receive reflected wave from an object. The radar units 60 and 61 correspond to vehicle distance detection device.

In addition to the various control blocks described above in the section of the previous embodiment, the electronic control unit 11 includes an image-data-and-radar-data processing section 70.

When the vehicle is running frontward, the image-data-and-radar-data processing section 70 performs known image processing on image data received from the CCD camera 55. On the basis of the processed image data, the image-data-and-radar-data processing section 70 detects the centerline of the road (lane) and calculates the turning radius of the detected centerline. When the vehicle is running rearward, the image-data-and-radar-data processing section 70 performs known image processing on image data received from the CCD camera 56. On the basis of the processed image data, the image-data-and-radar-data processing section 70 detects the centerline of the road (lane) and calculates the turning radius of the detected centerline. The image-data-and-radar-data processing section 70 outputs the calculated "turning radius" of the centerline to a vehicle peripheral-condition judgment processing section 80. The calculated "turning radius" serves as vehicle peripheral-condition data. On the basis of signals from the radar units 60 and 61, the image-data-and-radar-data processing section 70 calculates a relative, positional relation between the vehicle 1 and a preceding or following vehicle or an obstacle by a known calculation method. The relative, positional relation encompasses the distance to the other vehicle or an obstacle, relative speed (differential speed between the vehicle 1 and the other vehicle), and the like. The image-data-and-radar-data processing section 70 outputs the calculated relative "positional-relation data" regarding the other vehicle or an obstacle to the vehicle peripheral-condition judgment processing section 80. The calculated relative "positional-relation data" serve as vehicle peripheral-condition data. On the basis of the vehicle peripheral-condition data, the vehicle peripheral-condition judgment processing section 80 calculates a distribution-ratio correction coefficient and outputs the coefficient to a vehicle-peripheral-condition-reflective optimal-distribution processing section 90. Operation of the vehicle peripheral-condition judgment processing section 80 will be described later.

At the first stage, as in the case of the optimal-distribution processing section 42 of the previous embodiment, on the basis of a vehicle-control target value received from the target-value calculation section 40 and the grip factor $\epsilon$ received from the grip factor calculation section 41, the vehicle-peripheral-condition-reflective optimal-distribution processing section 90 calculates a distribution ratio for distribution of the vehicle-control target value among the drive, brake, and steering systems while referring to the map. At the second stage, the vehicle-peripheral-condition-reflective optimal-distribution processing section 90 multiplies the distribution ratio calculated at the first stage by the distribution-ratio correction coefficient received from the vehicle peripheral-condition judgment processing section 80, thereby yielding a new distribution ratio for the systems. On the basis of the new distribution ratio and the vehicle-control target value received from the target-value calculation section 40, the vehicle-peripheral-condition-reflective optimal-distribution processing section 90 generates a vehicle-control target value for the drive system, a vehicle-control target value for the brake system, and a vehicle-control target value for the steering system in equal number to objects of control and outputs the generated vehicle-control target values to the adders a1 to a3 as instruction values.

As described above, the vehicle-peripheral-condition-reflective optimal-distribution processing section 90 optimally distributes the vehicle-control target value that has been corrected for a peripheral condition of the vehicle, among the drive, brake, and steering systems in accordance with the grip factor $\epsilon$ and a peripheral condition of the vehicle.

Next, the function of the vehicle peripheral-condition judgment processing section 80 will be described.

The vehicle peripheral-condition judgment processing section 80 receives the vehicle peripheral-condition data from the image-data-and-radar-data processing section 70, as well as the vehicle speed V, the actual yaw rate $\gamma$, the steering angle $\theta$, and the like, and performs the following processings (A) to (C).

(A) In the case where a preceding and/or a following vehicle is present, in order to allow a distribution ratio to be set in consideration of the distance to the vehicle(s), the vehicle peripheral-condition judgment processing section 80 outputs the distribution-ratio correction coefficient to the vehicle-peripheral-condition-reflective optimal-distribution processing section 90. Calculation of the distribution-ratio correction coefficient in this case will be described below.

On the basis of the relative positional-relation data (distance (in this case, vehicle distance), relative speed, or the like), the vehicle peripheral-condition judgment processing section 80 judges whether or not at present the vehicle 1 is too close to the other vehicle. In this case, first, the vehicle peripheral-condition judgment processing section 80 refers to a relative-speed judgment threshold-value map and calculates a vehicle-distance judgment threshold value. A relative speed is obtained as "(speed of the vehicle 1)–(speed of the other vehicle)." The relative-speed judgment threshold-value map is prepared such that the higher the relative speed, the greater the vehicle-distance judgment threshold value. By use of the relative-speed judgment threshold-value map, the vehicle peripheral-condition judgment processing section 80 calculates a vehicle-distance judgment threshold value corresponding to a relative speed and compares the calculated vehicle-distance judgment threshold value with a vehicle distance.

When the vehicle-distance judgment threshold value is greater than the vehicle distance, the vehicle peripheral-condition judgment processing section 80 judges that the vehicle 1 is too close to the other vehicle. When the vehicle peripheral-condition judgment processing section 80 judges that the vehicle 1 is too close to the other vehicle, the vehicle peripheral-condition judgment processing section 80 outputs an appropriate distribution-ratio correction coefficient to the vehicle-peripheral-condition-reflective optimal-distribution processing section 90 in order to modify the allocation of the vehicle-control target value for a predetermined system.

The distribution-ratio correction coefficient is calculated on the basis of a "positional-relation data (vehicle distance and relative speed) vs. distribution-ratio correction coefficient" map. The map is made up of data obtained by test or the like and is stored in the ROM.

Specifically, for example, in the case where the other vehicle is a preceding vehicle, a distribution-ratio correction coefficient for increasing the allocation of the vehicle-control target value for the brake system is output to the vehicle-peripheral-condition-reflective optimal-distribution processing section 90. In addition to output of a distribution-ratio correction coefficient for increasing the allocation of the vehicle-control target value for the brake system, a distribution-ratio correction coefficient for increasing the allocation of the vehicle-control target value for the steering system may be output. In the case of increasing the allocation for the steering system, the increased allocation assumes such a value as to provide a steering angle such that the vehicle 1 avoids a collision with the preceding vehicle.

As a result, a possible collision with the other vehicle can be avoided, and terrifying the driver of the other vehicle can be avoided.

(B) On the basis of the vehicle peripheral-condition data (turning radius) regarding the centerline of the road extending ahead of the vehicle, the steering angle $\theta$, the vehicle speed V, the actual yaw rate $\gamma$, and the like, the vehicle peripheral-condition judgment processing section 80 judges whether or not the current state of steerage of the steering wheel SW and the current vehicle speed are appropriate for turning along an approaching corner in the road (lane); i.e., whether or not the vehicle can run in the lane without running off the lane.

In the case where the vehicle peripheral-condition judgment processing section 80 judges that the current steering angle $\theta$ of the steering wheel SW and the current vehicle speed V are inadequate for turning along the approaching corner, the vehicle peripheral-condition judgment processing section 80 calculates a target-value correction coefficient on the basis of a first map of "steering angle, vehicle speed, and yaw rate vs. target-value correction coefficient" so as to prevent the vehicle from running off the corner, and outputs the calculated target-value correction coefficient to the target-value calculation section 40. The first map is made up of data obtained by test or the like and is stored in the ROM.

In the present embodiment, the target-value calculation section 40 calculates the yaw rate difference $\Delta\gamma$ between the actual yaw rate $\gamma$ and the target yaw rate $\gamma^*$, and the calculated yaw rate difference $\Delta\gamma$ serves as a vehicle-control target value. In the case where the above-mentioned target-value correction coefficient is additionally input to the target-value calculation section 40, the target-value calculation section 40 multiplies the calculated yaw rate difference $\Delta\gamma$ by the target-value correction coefficient, to thereby generate a new vehicle-control target value. The target-value calculation section 40 outputs the new vehicle-control target value to the vehicle-peripheral-condition-reflective optimal-distribution processing section 90. Thus, the new vehicle-control target value is set such that the vehicle 1 does not run off the corner.

The vehicle peripheral-condition judgment processing section 80 calculates a distribution-ratio correction coefficient corresponding to the above-calculated target-value correction coefficient on the basis of a vehicle stabilization map and outputs the calculated distribution-ratio correction coefficient to the vehicle-peripheral-condition-reflective optimal-distribution processing section 90. The vehicle stabilization map contains data regarding the relation between the target-value correction coefficient and the distribution-ratio correction coefficient and is stored in the ROM. The data are obtained by test or the like beforehand.

Since the corrected vehicle-control target value from the target-value calculation section 40 and the distribution-ratio correction coefficient from the vehicle peripheral-condition judgment processing section 80 are input to the vehicle-peripheral-condition-reflective optimal-distribution processing section 90, the distribution ratio for distribution among actuators is calculated such that the vehicle 1 does not run off the corner and such that the vehicle 1 maintains its running stability, thereby compensating the driver's mistake in measuring the distance with his/her eyes and the driver's steering mistake. For example, the vehicle-peripheral-condition-reflective optimal-distribution processing section 90 can modify the distribution of drive force so as to prevent the vehicle from slipping.

(C) In the case where an obstacle is present ahead of the vehicle, the vehicle peripheral-condition judgment processing section 80 outputs the optimal target-value correction coefficient for correcting the vehicle-control target value for avoiding collision with the obstacle, and the distribution-ratio correction coefficient for correcting the distribution ratio for distribution of a vehicle-control target value among the steering, brake, and drive systems.

Specifically, on the basis of the relative positional-relation data (distance, relative speed, and the like), the vehicle peripheral-condition judgment processing section 80 judges whether or not, at present, an obstacle is present ahead of the vehicle. In the judgment, when the relative speed is equal to, for example, the vehicle speed, the obstacle is judged as a stationary one. The vehicle peripheral-condition judgment processing section 80 calculates the target-value correction coefficient on the basis of the steering angle θ, the vehicle speed V, the actual yaw rate γ, and the like while referring to a second map of "steering angle, vehicle speed, and yaw rate vs. target-value correction coefficient," and outputs the calculated target-value correction coefficient to the target-value calculation section 40. The second map is made up of data obtained by test or the like and is stored in the ROM. The second map contains data regarding the target-value correction coefficient such that the vehicle-control target value can be set while avoidance of the collision of the vehicle 1 with the obstacle is taken into consideration.

In the present embodiment, the target-value calculation section 40 calculates the yaw rate difference Δγ between the actual yaw rate γ and the target yaw rate γ*, and the calculated yaw rate difference Δγ serves as a vehicle-control target value. In the case where the above-mentioned target-value correction coefficient is additionally input to the target-value calculation section 40, the target-value calculation section 40 multiplies the calculated yaw rate difference Δγ by the target-value correction coefficient, to thereby generate a new vehicle-control target value. The target-value calculation section 40 outputs the new vehicle-control target value to the vehicle-peripheral-condition-reflective optimal-distribution processing section 90. Thus, the new vehicle-control target value is set such that the vehicle 1 avoids collision with the obstacle.

The vehicle peripheral-condition judgment processing section 80 calculates a distribution-ratio correction coefficient corresponding to the above-calculated target-value correction coefficient on the basis of the vehicle stabilization map and outputs the calculated distribution-ratio correction coefficient to the vehicle-peripheral-condition-reflective optimal-distribution processing section 90. The vehicle stabilization map contains data regarding the relation between the target-value correction coefficient and the distribution-ratio correction coefficient and is stored in the ROM. The data are obtained by test or the like beforehand.

Since the corrected vehicle-control target value from the target-value calculation section 40 and the distribution-ratio correction coefficient from the vehicle peripheral-condition judgment processing section 80 are input to the vehicle-peripheral-condition-reflective optimal-distribution processing section 90, the distribution ratio for distribution among actuators is calculated such that the vehicle 1 avoids collision with the obstacle and such that the vehicle 1 maintains its running stability.

Another embodiment is characterized not only by yielding the actions and effects of the previous embodiments described above in (1) and (2) in the description of the above embodiment, but also by the following:

(1) By use of the CCD cameras 55 and 56 and the radar units 60 and 61 (acquisition device), the peripheral-condition data regarding the vehicle 1 are acquired. The electronic control unit 11 (distribution-ratio-setting device) sets the distribution ratio for distribution of the vehicle-control target value among the actuators of the steering system, the brake system, and the drive system in accordance with the acquired vehicle peripheral-condition data and the grip factor of the front wheel.

As a result, the vehicle-control target value can be optimally distributed among the steering, brake, and drive systems in accordance with the grip factor ε and the peripheral condition of the vehicle. Thus, the running stability of the vehicle can be improved in accordance with the grip factor ε and the peripheral condition of the vehicle.

(2) The radar units 60 and 61 (acquisition device) serves as the vehicle distance detection device for detecting, particularly, the distance between the vehicle 1 (own vehicle) and the preceding vehicle. The electronic control unit 11 (distribution-ratio-setting device) varies the allocation of the vehicle-control target value for the actuators (electromagnetic valves in the hydraulic circuit 28) of the brake system in accordance with the vehicle distance. As a result, the running stability of the vehicle can be improved in accordance with the grip factor and the distance to the other vehicle, which is a peripheral condition of the vehicle.

(3) The CCD cameras 55 and 56 serve as the image capture device for capturing an image of a peripheral condition of the vehicle. On the basis of image data regarding the periphery of the vehicle acquired by the CCD cameras 55 and 56, the electronic control unit 11 (calculation device) calculates the turning radius of an approaching corner of the lane in which the vehicle 1 is running. On the basis of the current vehicle speed V and the current steering angle θ (vehicle behavioral-quantity), the electronic control unit 11 (judgment device) judges whether or not the vehicle 1 can run along the approaching corner having the above-mentioned turning radius. When the electronic control unit 11 judges that the vehicle 1 cannot run along the approaching corner having the above-mentioned turning radius while running in the lane, the electronic control unit 11 functions as the vehicle-control target value calculation device and calculates the target-value correction coefficient so as to allow the vehicle 1 to run along the approaching corner of the lane. On the basis of the calculated target-value correction coefficient, the electronic control unit 11 corrects the vehicle-control target value, thereby yielding a new vehicle-control target value. The electronic control unit 11 (distribution-ratio-setting device) sets the distribution ratio for distribution of the vehicle-control target value among the actuators of the steering system, the brake system, and the drive system such that the vehicle 1 can run along the approaching corner while running in the lane.

As a result, the distribution ratio for distribution among the actuators is calculated such that the vehicle 1 does not run off the corner and such that the vehicle 1 maintains its running stability, thereby compensating the driver's mistake in measuring the distance with his/her eyes and the driver's steering mistake.

(4) The radar units 60 and 61 (acquisition device) acquire peripheral-condition data regarding the vehicle 1. On the basis of peripheral-condition data acquired by the radar units 60 and 61 (acquisition device), the electronic control units 11 (obstacle judgment device) judges whether or not an obstacle is present ahead of the vehicle 1. When the electronic control unit 11 (vehicle-control target value calculation device) judges that an object is present ahead of the vehicle 1, the electronic control unit 11 calculates the vehicle-control target value while correction is made so as to avoid collision of the vehicle 1 with the obstacle. The electronic control unit 11 (distribution-ratio-setting device) varies the distribution ratio for distribution of the vehicle-control target value among the actuators of the three systems in such a manner as to avoid collision with the obstacle. As a result, while the vehicle 1 maintains running stability, the vehicle 1 can avoid collision with the obstacle.

Figure 22:
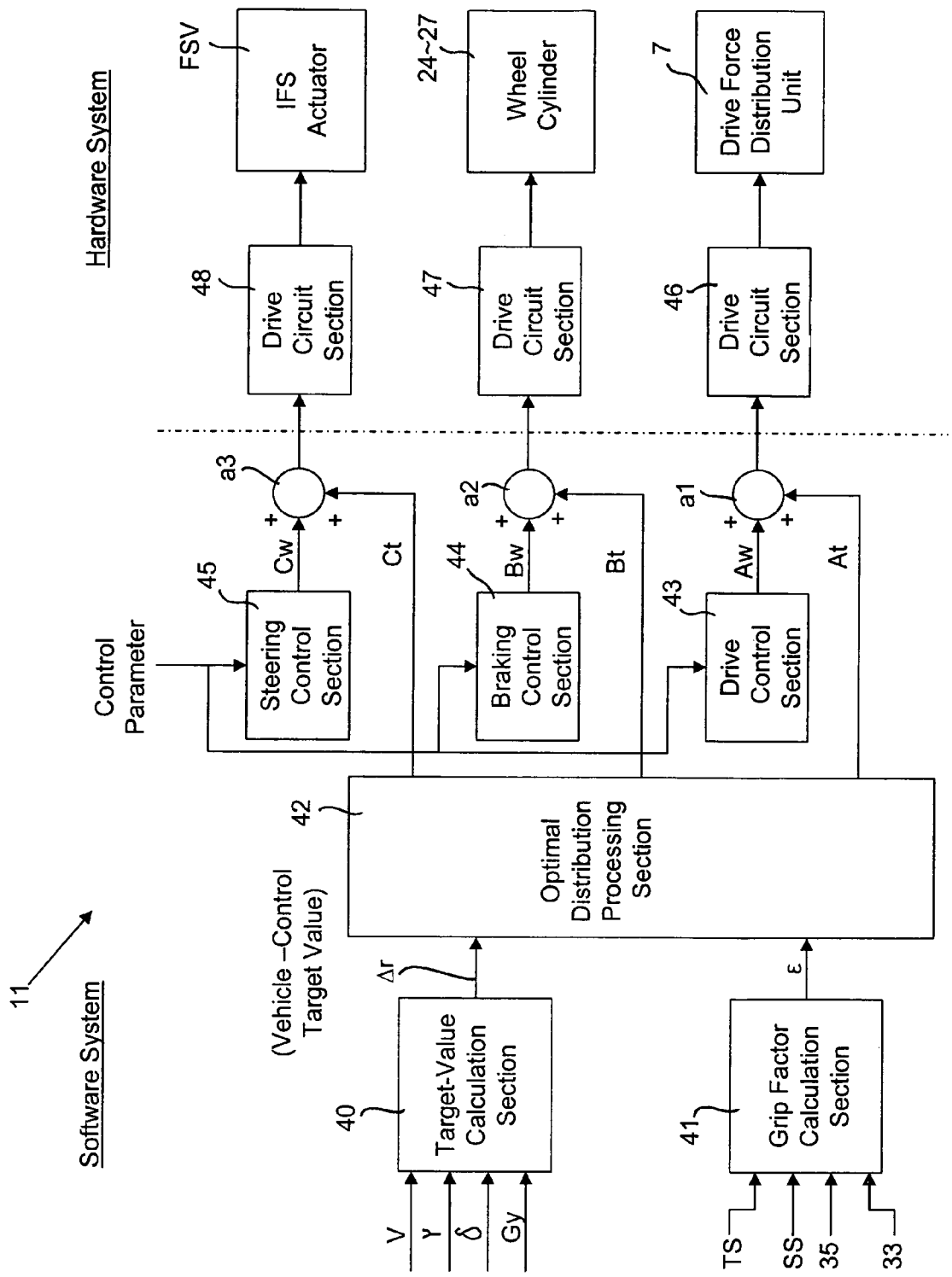
FIG. 22 is a control block diagram of an electronic control unit of an integrated control apparatus for a vehicle according to a further embodiment of the present invention.
Figure 23:
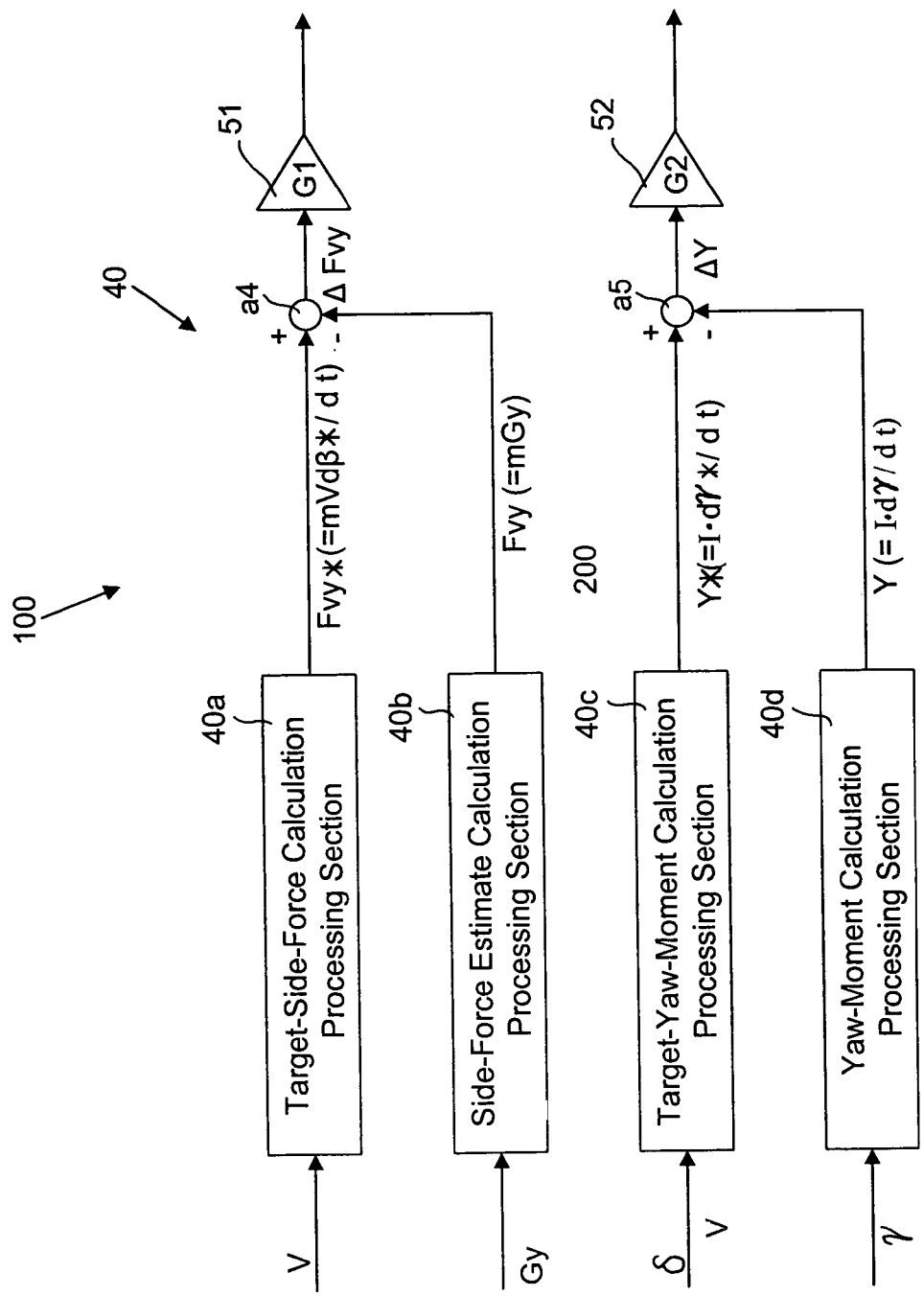
FIG. 23 is a control block diagram of a target-value calculation section of the electronic control.

Next, an embodiment of the present invention will next be described with reference to FIGS. 22 and 23. FIG. 22 is a control block diagram of the electronic control unit 11 of an integrated control apparatus for a vehicle according to this embodiment; and FIG. 23 is a control block diagram of the target-value calculation section 40 of the electronic control unit 11. In the above embodiment, the target-value calculation section 40 calculates the target yaw rate $\gamma^*$ as a target vehicle behavioral-quantity on the basis of the vehicle speed V and the actual steering angle $\delta$ and calculates the yaw rate difference $\Delta\gamma$ (vehicle-control target value) between the actual yaw rate $\gamma$ and the target yaw rate $\gamma^*$. By contrast, in this embodiment, the target-value calculation section 40 calculates the side force difference between the target side force and the actual side force (side force) and the yaw moment difference between the target yaw moment and the actual yaw moment; multiplies the side force difference and the yaw moment difference by respectively predetermined gains to thereby obtain respective vehicle-control target values; and outputs the obtained vehicle-control target values to the optimal-distribution processing section 42. The operation of the target-value calculation section 40 will be described below in detail.

As shown in FIG. 23, the target-value calculation section 40 includes a first vehicle-control target value generation section 100 related to side force, and a second vehicle-control target value generation section 200 related to yaw moment. The first vehicle-control target value generation section 100 includes a target-side-force calculation processing section 40a, a side-force estimate calculation processing section 40b, an adder a4, and an amplification section 51. As in the case of the first embodiment, the target-side-force calculation processing section 40a calculates the target slip angle $\beta^*$ on the basis of the vehicle speed V and the actual steering angle $\delta$ by a known calculation method. On the basis of the vehicle speed V and the target slip angle $\beta^*$, the target-side-force calculation processing section 40a calculates a target side force Fvy* ($=m\cdot V\cdot d\beta^*/dt$) at every sampling time. The target-side-force calculation processing section 40a corresponds to means for calculating the target side force; i.e., target-side-force calculation device.

The side-force estimate calculation processing section 40b calculates an actual side force Fvy ($=m\cdot Gy$) of the vehicle on the basis of the actual lateral acceleration Gy detected by the lateral acceleration sensor 35. m is inertial mass of the vehicle. The adder a4 calculates a side force difference $\Delta Fvy$ between the target side force Fvy* and the actual side force Fvy. The amplification section 51 multiplies the side force difference $\Delta Fvy$ by a predetermined gain G1 and outputs the product to the optimal-distribution processing section 42.

As shown in FIG. 23, the second vehicle-control target value generation section 200 includes a target-yaw-moment calculation processing section 40c, a yaw-moment estimate calculation processing section 40d, an adder a5, and an amplification section 52. The target-yaw-moment calculation processing section 40c calculates the target yaw rate $\gamma^*$ on the basis of the vehicle speed V and the actual steering angle $\delta$ in a manner similar to that of the first embodiment. On the basis of the target yaw rate $\gamma^*$ and the yawing moment of inertia I, the target-yaw-moment calculation processing section 40c calculates a target yaw moment Y* ($=I\cdot d\gamma^*/dt$). The target-yaw-moment calculation processing section 40c corresponds to device for calculating the target yaw moment; i.e., target-yaw-moment processing device. On the basis of the actual yaw rate $\gamma$ and the yawing moment of inertia I, the yaw-moment estimate calculation processing section 40d calculates the actual yaw moment Y ($=I\cdot d\gamma/dt$). The adder a5 calculates a yaw moment difference $\Delta Y$ between the target yaw moment Y* and the actual yaw moment Y. The amplification section 52 multiplies the yaw moment difference $\Delta Y$ by a predetermined gain G2 and outputs the product to the optimal-distribution processing section 42.

The optimal-distribution processing section 42 uses, as vehicle-control target values, the side force difference $\Delta Fvy$ and the yaw moment difference $\Delta Y$, which are resultant values after being calculated and multiplied by respectively predetermined gains in the target-value calculation section 40, and optimally distributes the vehicle-control target values among the steering system, the drive system, and the brake system on the basis of the grip factor $\epsilon$ of the front wheel estimated in the grip factor calculation section 41.

Distribution ratios for the steering, drive, and brake systems to be used in optimal distribution processing are stored in the ROM in the form of map. The map is prepared beforehand by a test or the like such that the distribution ratios vary in accordance with the magnitude of the absolute value of the side force difference $\Delta Fvy$, the magnitude of the absolute value of the yaw moment difference $\Delta Y$, and whether the side force difference $\Delta Fvy$ and the yaw moment difference $\Delta Y$ are positive or negative, and such that, for example, when the grip factor is below a predetermined threshold value, the grip factor is increased. The optimal-distribution processing section 42 performs optimal distribution processing on the basis of the map. Specifically, the distribution ratio is calculated in accordance with the grip factor. On the basis of the calculated distribution ratio, vehicle-control target values for the steering, drive, and brake systems are calculated. In other words, as a result of optimal distribution processing, the optimal-distribution processing section 42 generates a vehicle-control target value for the drive system, a vehicle-control target value for the brake system, and a vehicle-control target value for the steering system in equal number to objects of control. The generated vehicle-control target values are output to adders a1 to a3 as instruction values. Hereinafter, an instruction value for the drive system is called a "control instruction value At," a control value for the brake system is called a "control instruction value Bt," and an instruction value for the steering system is called a "control instruction value Ct." In the present embodiment, the number of objects of control is one each for the drive system and the steering system and four (wheel cylinders 24 to 27) for the brake system.

The control flowchart that the electronic control unit 11 of the embodiment will be described with reference to FIG. 7, which shows the control flowchart of an above embodiment. The description will mainly focus on control features different from those of the other embodiment.

In terms of the control flowchart, this embodiment differs from the other embodiment in the following processings: target vehicle behavioral-quantity calculation processing in step S300; vehicle-control target value calculation processing in step S400; and optimal distribution processing in step S600. Specifically, in step S300 of calculating a target vehicle behavioral-quantity, the target side force Fvy* and the target yaw moment Y* are calculated. In step S400, the side force difference ΔFvy between the target side force Fvy* and the actual side force Fvy and the yaw moment difference ΔY between the target yaw moment Y* and the actual yaw moment Y are calculated as vehicle-control target values. In step S600 of optimally distributing the vehicle-control target values among the actuators of the steering, brake, and drive systems, the optimal-distribution processing section 42 sets the distribution ratio for the systems in accordance with the magnitude of the absolute value of the side force difference ΔFvy, the magnitude of the absolute value of the yaw moment difference ΔY, and whether the side force difference ΔFvy and the yaw moment difference ΔY are positive or negative, and generates the control instruction values At, Bt, and Ct. Other steps are similar to those of the first embodiment, and thus repeated description thereof is omitted.

This embodiment secures the running stability of the vehicle by device of target follow-up control. Specifically, when disturbance is imposed on the vehicle 1, side force acting on the tires and yaw moment vary. In order to cope with such variation, the target side force Fvy* and the target yaw moment Y* are set, and the side force difference ΔFvy between the target side force Fvy* and the actual side force Fvy and the yaw moment difference ΔY between the target yaw moment Y* and the actual yaw moment Y are calculated as vehicle-control target values. As in the case of the other embodiment, in accordance with the grip factor input thereto, the optimal-distribution processing section 42 distributes the vehicle-control target values among the actuators of the steering, brake, and drive systems. Therefore, even when disturbance is imposed on the vehicle, robustness can be increased to thereby improve the running stability of the vehicle.

Notably, the embodiments of the present invention can be modified as described below.

(1) According to the embodiments, the present invention is embodied in a front-wheel steering vehicle in which the front right and left wheels are mechanically linked together. However, the present invention may be embodied in a 4-wheel steering vehicle. The 4-wheel steering vehicle is designed such that not only the front wheels but also the rear right and left wheels are mechanically linked together and steered. In the case where optimal distribution processing is performed for the three systems (drive system, brake system, and steering system) in the 4-wheel steering vehicle, the electronic control unit 11 estimates the grip factor of the rear wheel in a manner similar to that for estimating the grip factor of the front wheel. The electronic control unit 11 compares the grip factor of the front wheel and the grip factor of the rear wheel. When the grip factor of the front wheel is lower, the allocation of the vehicle-control target value for the steering system is lowered and the allocation for the drive and brake systems is increased.

When the grip factor of the rear wheel is lower than that of the front wheel, the allocation of the vehicle-control target value for the drive system is lowered to thereby lower the distribution of drive force to the rear wheels, and the allocation of the vehicle-control target value for the steering and brake systems is increased. As a result, the front wheels (tires), which have a margin in terms of grip factor, are effectively used, thereby improving the running stability of the vehicle.

(2) An embodiment is described while mentioning a change of the distribution ratio for distribution of the vehicle-control target value among the three systems. However, the distribution ratio for distribution of the vehicle-control target value between two of the three systems may be changed. This is performed, for example, as follows. When the currently estimated grip factor ε of the front wheel is lower than the last estimated value, the allocation of the vehicle-control target value for the steering system is lowered, and the allocation for the brake system is increased. In other words, the control instruction value Ct for the steering system is lowered than the last control instruction value Ct, and the control instruction value Bt for the brake system is increased from the last control instruction value Bt.

In the case where the vehicle is running at a given vehicle speed V, the steering angle of the IFS actuator FSV becomes small, so that even when the steering angle of the steering wheel SW is large, the front wheels are steered to a small extent. Since the control instruction value Bt for the brake system becomes greater than the last control instruction value Bt, the braking force increases. As a result, the rear wheels, which have a margin in terms of the grip factor, are effectively used, thereby improving the running stability of the vehicle.

Also, in the four-wheel steering vehicle mentioned above in (1), the distribution ratio for distribution of the vehicle-control target value between two of the three systems may be changed. Also, in this case, for example, when the currently estimated grip factor ε of the front wheel is lower than the last estimated value, the allocation of the vehicle-control target value for the steering system is lowered, and the allocation for the brake system is increased. In other words, the control instruction value Ct for the steering system is lowered than the last control instruction value Ct, and the control instruction value Bt for the brake system is increased from the last control instruction value Bt.

(3) Another embodiment employs the CCD cameras 55 and 56 and the radar units 60 and 61 so as to acquire frontward and rearward peripheral conditions of the vehicle. However, the CCD camera and the radar unit may be provided so as to acquire only the frontward peripheral condition of the vehicle. Since the vehicle runs usually frontward, only the frontward peripheral condition of the vehicle is captured. The design idea of capturing only the frontward peripheral condition of the vehicle may only be applied to either the CCD camera or the radar unit.

(4) One embodiment, the radar units 60 and 61 (acquisition device) serve as the vehicle distance detection device for detecting the distance between the vehicle 1 (own vehicle) and the other vehicle (preceding vehicle) running ahead of the vehicle 1. The electronic control unit 11 (distribution-ratio-setting device) varies the allocation of the vehicle-control target value for the actuators of the brake system (electromagnetic valves of the hydraulic circuit 28) in accordance with the vehicle distance. In place of this configuration, the radar units 60 and 61 (acquisition device) may serve as vehicle distance detection device for detecting the vehicle distance between the vehicle 1 (own vehicle) and the other vehicle (following vehicle) running behind the vehicle 1. In this case, the electronic control unit 11 (distribution-ratio-setting device) varies the allocation of the vehicle-control target value for an actuator of the drive system (for example, the electronic throttle of the engine EG) in accordance with the vehicle distance. Specifically, for example, a vehicle-distance judgment threshold value corresponding to a certain vehicle speed is calculated; and when the electronic control unit 11 judges that a vehicle distance is shorter than the vehicle-distance judgment threshold value, the electronic control unit 11 controls the electronic throttle so as to increase throttle opening. As a result, the vehicle speed increases to thereby increase the distance to the following vehicle. Thus, the running stability of the vehicle can be improved in accordance with the distance to the other vehicle (following vehicle) and the grip factor. The distance serves as a peripheral condition of the vehicle.

The integrated control apparatus for a vehicle may have both the function of another embodiment and the function described above in (4), or either one.

(5) According to the above-described embodiments, the present invention is embodied in the vehicle 1 having the drive force distribution unit 7 for changing the drive force distribution ratio between the front wheels and the rear wheels. However, the present invention may be embodied as an integrated control apparatus for a vehicle that can independently change the distribution of drive force between the front right wheel and the front left wheel and the distribution of drive force between the rear right wheel and the rear left wheel.

(6) In an embodiment, the accelerator pedal AP serves as the driving-operation device. However, the brake pedal BP and the steering wheel SW may serve as the driving-operation device. In this case, the stepping-on force and the steering angle θ (or the steering angular-speed) correspond to respective driving-operation quantities effected by the driver.

Technical ideas acquired from the above-described embodiments are described below.

(1) The integrated control apparatus for a vehicle of the present invention is characterized in that the estimation device includes the steering-force index detection device for detecting at least one of steering-force indexes including steering torque and steering force, which are applied to the steering system of the vehicle ranging from the steering wheel to suspension; the self-aligning torque estimation device for estimating self-aligning torque generated on the front wheel, on the basis of a detection signal received from the steering-force index detection device; the front-wheel index estimation device for estimating at least one of front-wheel indexes including side force acting on the front wheel and front-wheel slip angle, on the basis of a detection signal from the vehicle behavioral-quantity detection device; and the grip factor estimation device for estimating the grip factor of at least the front wheel on the basis of the change, from the last estimated value, of a self-aligning torque that is newly estimated by the self-aligning torque estimation device in relation to a front-wheel index estimated by the front-wheel index estimation device. According to the present technical idea (1), the self-aligning torque exhibits a peak at a smaller slip angle than does the side force Fyf. Therefore, since the lowering of grip of the tire can be identified before the critical region of the vehicle is reached, the vehicle-control target value can be optimally distributed among the actuators, thereby improving the running stability of the vehicle.

(2) The integrated control apparatus for a vehicle as described above in the technical idea (1) is characterized by further comprising the reference self-aligning torque setting device for setting a reference self-aligning torque on the basis of the front-wheel index estimated by the front-wheel index estimation device and a self-aligning torque estimated by the self-aligning torque estimation device, and is characterized in that the grip factor estimation device estimates the grip factor of wheels on the basis of the result of comparison between the reference self-aligning torque set by the reference self-aligning torque setting device and the self-aligning torque estimated by the self-aligning torque estimation device. The apparatus of the technical idea (2) can readily yield the actions and effects of the apparatus of the above-described technical idea (1).

(3) The integrated control apparatus for a vehicle as described above in the technical idea (2) is characterized in that the reference self-aligning torque setting device sets a reference self-aligning torque characteristic from a characteristic of the front-wheel index estimated by the front-wheel index estimation device vs. the self-aligning torque estimated by the self-aligning torque estimation device such that the reference self-aligning torque characteristic is linearly approximated by at least a straight line passing through the origin, and that the reference self-aligning torque is set on the basis of the reference self-aligning torque characteristic. The apparatus of the technical idea (3) can readily yield the actions and effects of the apparatus of the above-described technical idea (2).

Obviously, numerous modifications and variations of the present invention are possible in light of the above teachings. It is therefore to be understood that within the scope of the appended claims, the present invention may be practiced otherwise than as specifically described herein.

What is claimed is:

1. An integrated control apparatus for a vehicle, comprising:
   vehicle behavioral-quantity detection device detecting a vehicle behavioral-quantity;
   target vehicle behavioral-quantity calculation device calculating a target vehicle behavioral-quantity in accordance with the vehicle behavioral-quantity;
   vehicle-control target value calculation device calculating a vehicle-control target value on the basis of a difference between the target vehicle behavioral-quantity and the vehicle behavioral-quantity;
   estimation device estimating a grip factor of a front wheel to road surface;
   distribution-ratio-setting device setting, in accordance with the grip factor of the front wheel, a distribution ratio for distribution of the vehicle-control target value among actuators of at least two of a steering system, a brake system, and a drive system; and
   control device controlling the actuators of the at least two systems in accordance with the vehicle-control target value distributed at the distribution ratio.

2. An integrated control apparatus for a vehicle as described in claim 1, wherein the target vehicle behavioral-quantity calculation device calculates a target yaw rate serving as the target vehicle behavioral-quantity; and
   the vehicle-control target value calculation device calculates the vehicle-control target value on the basis of a difference between the target yaw rate and an actual yaw rate serving as the vehicle behavioral-quantity.

3. An integrated control apparatus for a vehicle as described in claim 1, wherein the target vehicle behavioral-quantity calculation device includes device calculating a target side force, which serves as the target vehicle behavioral-quantity, and device calculating a target yaw moment of the vehicle, which serves as the target vehicle behavioral-quantity; and the vehicle-control target value calculation device calculates the vehicle-control target value on the basis of a difference between the target side force and a side force, which serves as the vehicle behavioral-quantity, and a difference between the target yaw moment of the vehicle and an actual yaw moment of the vehicle, which serves as the vehicle behavioral-quantity.

4. An integrated control apparatus for a vehicle as described in claim 1, wherein the vehicle behavioral-quantity detection detects a quantity of driver's operation applied to driving-operation device of the vehicle; and the distribution-ratio-setting device sets a distribution ratio for distribution of the vehicle-control target value among the actuators of at least two of the steering system, the brake system, and the drive system in accordance with the quantity of the driver's operation and the grip factor of the front wheel.

5. An integrated control apparatus for a vehicle as described in claim 1, further comprising acquisition device for acquiring a peripheral condition of the vehicle, wherein the distribution-ratio-setting device sets a distribution ratio for distribution of the vehicle-control target value among the actuators of at least two of the steering system, the brake system, and the drive system in accordance with peripheral-condition data regarding the vehicle acquired by the acquisition device and the grip factor of the front wheel.

6. An integrated control apparatus for a vehicle as described in claim 5, wherein the acquisition device includes vehicle distance detection device for detecting a distance between a vehicle and another vehicle as measured at least in a running direction of the vehicle or in a direction opposite the running direction; and the distribution-ratio-setting device changes the distribution ratio for distribution of the vehicle-control target value to the actuator(s) of the brake system or the drive system in accordance with the detected distance.

7. An integrated control apparatus for a vehicle as described in claim 5, further comprising:

image capture device, as the acquisition device, capturing an image of a peripheral condition of the vehicle;

calculation device calculating a radius of an approaching curve of a lane in which the vehicle is running, on the basis of image data regarding the peripheral condition of the vehicle captured by the image capture device; and judgment device judging whether or not the vehicle can run along the curve having the calculated radius;

wherein when the judgment device judges that the vehicle cannot run along the curve having the calculated radius while running in the lane, the vehicle-control target value calculation device calculates the vehicle-control target value while making correction for allowing the vehicle to run along the curve while running in the lane; and the distribution-ratio-setting device sets a distribution ratio for distribution of the vehicle-control target value among the actuators of at least two of the steering system, the brake system, and the drive system such that the vehicle can run along the curve while running in the lane.

8. An integrated control apparatus for a vehicle as described in claim 5, further comprising obstacle judgment device judging from peripheral-condition data acquired by the acquisition device whether or not an obstacle is present ahead of the vehicle;

wherein when the obstacle judgment device judges that an obstacle is present, the vehicle-control target value calculation device calculates the vehicle-control target value while making correction for the vehicle to avoid collision with the obstacle; and the distribution-ratio-setting device sets a distribution ratio for distribution of the vehicle-control target value among the steering system, the brake system, and the drive system such that the vehicle avoids collision with the obstacle.

* * * * *